United States Patent
Masuko et al.

(10) Patent No.: US 11,010,422 B2
(45) Date of Patent: May 18, 2021

(54) IMAGE DISPLAY SYSTEM, IMAGE DISPLAY METHOD, AND IMAGE DISPLAY PROGRAM

(71) Applicant: Rakuten, Inc., Tokyo (JP)

(72) Inventors: Soh Masuko, Tokyo (JP); Tomoyuki Mukasa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 389 days.

(21) Appl. No.: 15/754,372

(22) PCT Filed: Aug. 31, 2016

(86) PCT No.: PCT/JP2016/075531
§ 371 (c)(1),
(2) Date: Feb. 22, 2018

(87) PCT Pub. No.: WO2017/038882
PCT Pub. Date: Mar. 9, 2017

(65) Prior Publication Data
US 2018/0253446 A1    Sep. 6, 2018

(51) Int. Cl.
*G06F 16/583*    (2019.01)
*G06Q 30/06*    (2012.01)
*G06F 3/0484*    (2013.01)

(52) U.S. Cl.
CPC ...... *G06F 16/5838* (2019.01); *G06F 3/04842* (2013.01); *G06F 3/04847* (2013.01); *G06Q 30/06* (2013.01); *G06Q 30/0643* (2013.01)

(58) Field of Classification Search
CPC .......... G06F 17/30256; G06F 3/04847; G06F 16/5838; G06F 3/04842; G06Q 30/0643; G06G 30/0643; G06G 30/06
See application file for complete search history.

(56) References Cited

U.S. PATENT DOCUMENTS 9,965,800 B1 * 5/2018 Pitstick .............. G06Q 30/0643
10,008,039 B1 * 6/2018 Neustein ................. G06T 11/60
(Continued)

FOREIGN PATENT DOCUMENTS

JP    2001-147959 A    5/2001

OTHER PUBLICATIONS

International Search Report dated Nov. 15, 2016 issued by the International Searching Authority in International application No. PCT/JP2016/075531.

*Primary Examiner* — William L Bashore
*Assistant Examiner* — Gregory A Distefano
(74) *Attorney, Agent, or Firm* — Sughrue Mion, PLLC

(57) ABSTRACT

An image display system includes an acquisition means for acquiring operation information containing a moving direction and a moving amount of an input position in an input operation on a first display object, the input operation being performed when the first display object is displayed on a display device, an extraction means for, when the moving amount of the input position in a predetermined first direction exceeds a predetermined threshold, acquiring a first attribute parameter of the first display object which corresponds to the first direction, and extracting a second display object associated with the first display object and having a first attribute parameter different from the first display object from a storage means where a plurality of display objects are associated with attribute parameters, and a display control means for displaying the second display object extracted by the extraction means, instead of the first display object, on the display device.

23 Claims, 22 Drawing Sheets

(56) References Cited

U.S. PATENT DOCUMENTS

| | | | |
|---|---|---|---|
| 2006/0204137 A1* | 9/2006 | Shimoda | G06T 11/60 382/298 |
| 2007/0130515 A1* | 6/2007 | Maas | G06T 19/00 715/201 |
| 2008/0071559 A1* | 3/2008 | Arrasvuori | G06T 19/006 705/26.1 |
| 2009/0113349 A1* | 4/2009 | Zohar | G06Q 30/00 715/852 |
| 2012/0007854 A1* | 1/2012 | Cho | G06F 3/04815 345/419 |
| 2012/0123897 A1* | 5/2012 | Gargiulo | G06Q 30/0621 705/26.5 |
| 2012/0306766 A1* | 12/2012 | Moore | G06F 3/04883 345/173 |
| 2013/0013403 A1* | 1/2013 | Masuko | G06Q 30/02 705/14.49 |
| 2013/0211938 A1* | 8/2013 | Allaqaband | G06Q 20/18 705/21 |
| 2014/0201024 A1* | 7/2014 | Collier | G06Q 30/0621 705/26.5 |
| 2014/0244447 A1* | 8/2014 | Kim | G06Q 30/0643 705/27.2 |
| 2014/0279242 A1* | 9/2014 | Staicut | G06Q 30/0643 705/26.61 |
| 2015/0324881 A1* | 11/2015 | Ouimet | G06Q 30/02 705/14.49 |
| 2017/0132694 A1* | 5/2017 | Damy | G06F 3/04842 |

\* cited by examiner

Fig.4

| CLOTHING ID | ATTRIBUTE 1 (SIZE) | ATTRIBUTE 2 | CLOTHING IMAGE DATA | MEASUREMENT DATA |
|---|---|---|---|---|
| C1 | S | — | G11 | E11 |
| | M | | G12 | E12 |
| | L | | G13 | E13 |
| C2 | S | MEDIUM | G211 | E211 |
| | M | | G212 | E212 |
| | L | | G213 | E213 |
| | S | LONG | G221 | E221 |
| | M | | G222 | E222 |
| | L | | G223 | E223 |
| ... | | ... | ... | ... |

| CLOTHING ID | DIRECTION | THRESHOLD | ATTRIBUTE TO BE CHANGED: DIRECTION OF CHANGE |
|---|---|---|---|
| C1 | D11 | T11 | SIZE: SMALL→LARGE |
| C1 | D12 (OPPOSITE DIRECTION TO D11) | T12 | SIZE: LARGE→SMALL |
| C2 | D211 (CROSSWISE (RIGHTWARD) DIRECTION) | T211 | SIZE: SMALL→LARGE |
| C2 | D212 (OPPOSITE DIRECTION TO D211) | T212 | SIZE: LARGE→SMALL |
| C2 | D221 (LENGTHWISE (DOWNWARD) DIRECTION) | T221 | ATTRIBUTE 2: MEDIUM→LONG |
| C2 | D222 (OPPOSITE DIRECTION TO D221) | T222 | ATTRIBUTE 2: LONG→MEDIUM |
| ... | ... | ... | ... |

Fig.6

| CLOTHING ID | ATTRIBUTE 1 (SIZE) | ATTRIBUTE 2 | STOCK QUANTITY |
|---|---|---|---|
| C1 | S | — | M11 |
|  | M | — | M12 |
|  | L | — | M13 |
| C2 | S | MEDIUM | M211 |
|  | M | MEDIUM | M212 |
|  | L | MEDIUM | M213 |
|  | S | LONG | M221 |
|  | M | LONG | M222 |
|  | L | LONG | M223 |
| ... | ... | ... | ... |

IMAGE DISPLAY SYSTEM, IMAGE DISPLAY METHOD, AND IMAGE DISPLAY PROGRAM

This is a National Stage of International Application No. PCT/JP2016/075531 filed Aug. 31, 2016, claiming priority based on International Application No. PCT/JP2015/074871 filed Sep. 1, 2015, the contents of which are incorporated herein by reference in its entirety.

TECHNICAL FIELD

The present invention relates to an image display system, an image display method, and an image display program.

BACKGROUND ART

Systems that present an image of an object such as a product have been known. In such systems, an object in accordance with specification of an attribute value such as the size of the product or the like is displayed. As an example of such systems, a system that displays a clothing image to be imposed on a human body model image and presents it to a user is known. For example, a technique that, based on human body shape data representing a user and clothing shape data of clothing selected by specifying a size, generates and displays a trial fitting image showing the state of trying on the clothing is known (for example, see Patent Literature 1).

CITATION LIST

Patent Literature

PTL1: Japanese Unexamined Patent Publication No. 2001-147959

SUMMARY OF INVENTION

Technical Problem

However, in the case of changing the size of clothing that is displayed in order to get to know clothing in an appropriate size, it has been necessary to perform an operation to select the size of clothing by a check box, a pull down menu or the like and further perform an operation to display an image of clothing in the selected size according to related art. In other words, it has been necessary to perform a plurality of operations in order to change the size, which is an attribute of displayed clothing, and thus the operation has been complex.

In view of the foregoing, an object of the present invention is to make it possible to change an attribute parameter of a displayed object by an easy and intuitive operation.

Solution to Problem

To solve the above problem, an image display system according to one aspect of the present invention includes an acquisition means for acquiring operation information containing a moving direction and a moving amount of an input position in an input operation on a first display object, the input operation being performed when the first display object is displayed on a display device; an extraction means for, when the moving amount of the input position in a predetermined first direction exceeds a predetermined threshold, acquiring a first attribute parameter of the first display object which corresponds to the first direction, and extracting a second display object associated with the first display object and having a first attribute parameter different from the first display object from a storage means where a plurality of display objects are associated with attribute parameters; and a display control means for displaying the second display object extracted by the extraction means, instead of the first display object, on the display device.

An image display method according to one aspect of the present invention is an image display method in an image display system, the method including an acquisition step of acquiring operation information containing a moving direction and a moving amount of an input position in an input operation on a first display object, the input operation being performed when the first display object is displayed on a display device; an extraction step of, when the moving amount of the input position in a predetermined first direction exceeds a predetermined threshold, acquiring a first attribute parameter of the first display object which corresponds to the first direction, and extracting a second display object associated with the first display object and having a first attribute parameter different from the first display object from a storage means where a plurality of display objects are associated with attribute parameters; and a display control step of displaying the second display object extracted in the extraction step, instead of the first display object, on the display device.

An image display program according to one aspect of the present invention causes a computer to function as an acquisition means for acquiring operation information containing a moving direction and a moving amount of an input position in an input operation on a first display object, the input operation being performed when the first display object is displayed on a display device; an extraction means for, when the moving amount of the input position in a predetermined first direction exceeds a predetermined threshold, acquiring a first attribute parameter of the first display object which corresponds to the first direction, and extracting a second display object associated with the first display object and having a first attribute parameter different from the first display object from a storage means where a plurality of display objects are associated with attribute parameters; and a display control means for displaying the second display object extracted by the extraction means, instead of the first display object, on the display device.

According to the above aspects, when an input operation that is performed while a first display object is displayed is acquired, and when the moving amount of the input position in a predetermined direction exceeds a predetermined threshold, a second display object having a different attribute parameter from the first display object is displayed instead of the first display object, and therefore it is possible to change the attribute parameter of the displayed display object by one operation that is intuitive and as easy as moving the input position in response to a request for a change in attribute parameter. Further, because the second display object that is displayed instead of the first display object is extracted from display objects that are prestored as variations on the attribute parameter of this display object, it is possible to display a display object having the actually existing attribute parameter, differently from scale-up or scale-down processing of a displayed display object.

In an image display system according to another aspect, the first attribute parameter relates to a size of the display object or the number of component objects of the display object, and when the moving amount of the input position in the first direction contained in the operation information exceeds a predetermined threshold, the extraction means extracts, as the second display object, a display object different in the size or a display object different in the number of component objects from the first display object from the storage means.

According to the above aspect, when an input operation that is performed while a first display object is displayed is acquired, and when the moving amount of the input position in a predetermined direction exceeds a predetermined threshold, a display object in a different size from the first display object or a display object with a different number of component objects from the first display object is displayed instead of the first display object, and therefore it is possible to change the size or the number of component objects of the displayed display object by one operation that is intuitive and as easy as moving the input position in response to a request for changing the size or the number of component objects. Further, because the second display object that is displayed instead of the first display object is extracted from display objects that are prestored as variations on the size or the number of component objects of this display object, it is possible to display a display object in the actually existing size or with the actually existing number of component objects, differently from scale-up or scale-down processing of a displayed display object.

In an image display system according to another aspect, when the moving amount in a second direction different from the first direction exceeds a predetermined threshold, the extraction means may acquire a second attribute parameter of the first display object which corresponds to the second direction, and extract a second display object associated with the first display object and having a second attribute parameter different from the first display object from the storage means.

According to the above aspect, an input operation that is performed while a first display object is displayed is acquired, and depending on whether the moving amount of the input position in each of the first direction and the second direction exceeds a predetermined threshold or not, a second display object having first and second attribute parameters different from the first display object is displayed instead of the first display object, and it is thereby possible to display the display object having different first and second attribute parameters from the displayed first display object in one intuitive and easy operation.

In an image display system according to another aspect, the display object is a clothing image, the storage means stores a plurality of clothing images in different sizes in association with sizes, the acquisition means acquires the operation information of an input operation on a first clothing image, the input operation being performed when the first clothing image is displayed on a display device, when the moving amount of the input position in the first direction contained in the operation information exceeds a predetermined threshold, the extraction means extracts, as a second clothing image, a clothing image in a different size from the first clothing image among clothing images associated with the first clothing image from the storage means, and the display control means displays the second clothing image extracted by the extraction means, instead of the first clothing image, on the display device.

According to the above aspect, when an input operation that is performed while a first clothing image is displayed is acquired, and when the moving amount of the input position in a predetermined direction exceeds a predetermined threshold, a clothing image in a different size from the first clothing image is displayed instead of the first clothing image, and it is thereby possible to change the size of the displayed clothing image by one operation that is intuitive and as easy as moving the input position in response to a request for changing the size. Further, because the second clothing image that is displayed instead of the first clothing image is extracted from clothing images that are prestored as variations on the size of this clothing, it is possible to display a clothing image in the actually existing size, differently from scale-up or scale-down processing of a displayed clothing image.

In an image display system according to another aspect, when the moving amount of the input position in a predetermined direction exceeds a predetermined threshold, the extraction means may extract a clothing image in a larger size than the first clothing image as the second clothing image, and when the moving amount of the input position in a direction opposite to the predetermined direction exceeds a predetermined threshold, the extraction means may extract a clothing image in a smaller size than the first clothing image as the second clothing image.

According to the above aspect, a clothing image in a larger size than the displayed clothing image is displayed by an operation of moving an input position in a predetermined direction, and a clothing image in a smaller size than the displayed clothing image is displayed by an operation of moving an input position in a direction opposite to a predetermined direction, and a user can thereby change the size of a displayed clothing image as desired by changing the moving direction of the input position. It is thereby possible to easily change the size of a displayed clothing image by an intuitive operation.

In an image display system according to another aspect, when the moving speed of the input position is lower than a predetermined speed, the extraction means may extract a clothing image in one level larger size or a clothing image in one level smaller size than the first clothing image as the second clothing image, and when the moving speed of the input position is equal to or higher than a predetermined speed, the extraction means may extract a clothing image in two or more levels larger size or a clothing image in two or more levels smaller size than the first clothing image as the second clothing image.

According to the above aspect, when an input operation that moves an input position at a speed equal to or higher than a predetermined speed is performed, the size of a clothing image is changed to be still larger or smaller than when an input operation that moves an input position at a speed lower than a predetermined speed is performed, and a user can thereby determine the extent of changing the size of a displayed clothing image by changing the speed of an input position. Therefore, display of a desired size is achieved by an intuitive operation.

In an image display system according to another aspect, the extraction means may set the predetermined threshold for each size and at least one of attribute values other than the size of a clothing image based on information about a user related to the input operation.

According to the above aspect, a threshold related to the moving amount of an input position in accordance with the size and the attribute value of a clothing image is set based on information about a user, it is possible to perform control so as to facilitate display of a clothing image in a desired size of the user.

In an image display system according to another aspect, the clothing image has a size as an attribute and another attribute other than the size, a plurality of clothing images in different sizes and having different attribute values of the another attribute are associated with one another in the storage means, and when the moving amount of the input position in a first direction exceeds a predetermined first threshold, the extraction means may extract a clothing image in a different size from the first clothing image as the second clothing image, and when the moving amount of the input position in a second direction exceeds a predetermined second threshold, the extraction means may extract a clothing image in a different attribute value of the another attribute from the first clothing image as the second clothing image.

According to the above aspect, an input operation that is performed while a first clothing image is displayed is acquired, and depending on whether the moving amount of the input position in each of a first direction and a second direction exceeds predetermined first and second threshold, respectively, the clothing image in a different size and having a different attribute value of another attribute from the first clothing image is displayed instead of the first clothing image, and it is thereby possible to display the clothing image having a different size and a different attribute value from the displayed first clothing image in one intuitive and easy operation. Further, because the second clothing image that is displayed instead of the first clothing image is extracted from clothing images that are prestored as variations on the attribute of this clothing, it is possible to display a clothing image having the actually existing attribute.

In an image display system according to another aspect, a clothing image is associated with stock information regarding presence or absence of stock of clothing shown in the clothing image, when a clothing image in a larger size than the first clothing image is extracted and when stock information associated with the extracted clothing image indicates that clothing shown in the clothing image is out of stock, the extraction means may re-extract a clothing image in a larger size than the extracted clothing image as the second clothing image, when a clothing image in a smaller size than the first clothing image is extracted and when stock information associated with the extracted clothing image indicates that clothing shown in the clothing image is out of stock, the extraction means may re-extract a clothing image in a smaller size than the extracted clothing image as the second clothing image, and the display control means may display the second clothing image re-extracted by the extraction means, instead of the first clothing image, on the display device.

According to the above aspect, when a clothing image of clothing that is out of stock is extracted, a clothing image in a still larger or smaller size than this clothing is re-extracted, and thus a clothing image of clothing that is out of stock is not displayed. It is thereby possible to prevent a clothing image of clothing that is out of stock from being presented to a user.

In an image display system according to another aspect, the display control means may display a human body model image representing a user related to the input operation on the display device based on information about a physical size of the user, and display the second clothing image to be superimposed on the human body model image.

According to the above aspect, a clothing image is displayed superimposed on a human body model image that reflects the physical features of a user, and it is thereby possible to grasp the state of the user wearing the clothing shown in the clothing image.

In an image display system according to another aspect, the human body model image may have a reference position indicating a position of a specified part of a human body, a clothing image may have a superposition reference position indicating a position to be superimposed on the part, and the display control means may display the second clothing image to be superimposed on the human body model image by setting the superposition reference position at the reference position.

According to the above aspect, a clothing image is appropriately superimposed on a human body model image, and it is thereby possible to appropriately show the state of wearing the clothing shown in the clothing image.

In an image display system according to another aspect, the display object represents an object and has first to third attribute parameters respectively representing a length along each of coordinate axes in a three-axis coordinate system of the object, and when the moving amount of the input position in any of predetermined first to third directions different from one another exceeds a predetermined threshold, the extraction means may acquire at least one attribute parameter of the first to third attribute parameters in accordance with a coordinate axis corresponding to the moving direction of the input position based on correspondence between first to third axes in the object and the first to third directions, the correspondence being determined based on an orientation of the first display object displayed on the display device, and extract a second display object different from the first display object in the acquired at least one of the first to third attribute parameters.

According to the above aspect, when an input operation that is performed while a first display object is displayed is acquired, and when the moving amount of the input position in predetermined first to third directions exceeds a predetermined threshold, a second display object where a variable attribute parameter acquired based on the correspondence between the first to third axes in the object and the first to third directions is different from that of the first display object is extracted, and the extracted second display object is displayed on the display device. It is thereby possible to display the second display object, which is different from the first display object in any of the lengths along the first to third axes, in one intuitive and easy operation.

In an image display system according to another aspect, the extraction means may extract, as the second display object, a display object associated with the first display object in the storage means and where at least one of the first to third attribute parameters has a value immediately larger or smaller than that of the first display object, or the extraction means may extract the second display object by making a search, in the storage means, at least containing, as search criteria regarding at least one of the first to third attribute parameters, a value obtained by adding a predetermined value to at least one value of the first to third attribute parameters of the first display object or a value obtained by multiplying the at least one value by a predetermined value.

According to the above aspect, a second display object that is associated in advance with a first display object in the storage means is extracted in response to an input operation, or the second display object is extracted by searching the storage means with search criteria containing the value of an attribute parameter in accordance with an input operation even when a display object having an attribute parameter in accordance with an input operation is not associated in advance with the first display object. It is thereby possible to display the second display object appropriately.

In an image display system according to another aspect, based on an image on which the display object is to be superimposed, the image showing a space where an object represented by the display object is to be placed, the extraction means may acquire constraints regarding a size of the object, and create the search criteria based on the constraints.

According to the above aspect, the second display object in an appropriate size for the space where an object represented by the display object is to be placed is extracted.

In an image display system according to another aspect, based on an image on which the display object is to be superimposed, the image showing a space where an object represented by the display object is to be placed, the display control means may acquire constraints regarding a size of the object, and when an object represented by the second display object does not satisfy the constraints, continue to display the first display object without displaying the second display object on the display device.

According to the above aspect, it is possible to prevent display of the second display object in an inappropriate size for the space where an object represented by the display object is to be placed.

In an image display system according to another aspect, based on an image on which the display object is to be superimposed, the image showing a space where an object represented by the display object is to be placed, the display control means may acquire a reference position related to placement of the object, and display the second display object to be superimposed on the image of the space by setting a superposition reference position indicating a position to be superimposed on the reference position in the second display object at the reference position.

According to the above aspect, the second display object is appropriately superimposed for the space where an object represented by the display object is to be placed, and it is thereby possible to appropriately show the state where the object represented by the second display object is placed in the space.

In an image display system according to another aspect, the input operation may be pinching, swiping or dragging on a screen where the first display object is displayed.

According to the above aspects, it is possible to change an attribute parameter of a displayed display object by a very easy operation.

Advantageous Effects of Invention

According to one aspect of the present invention, it is possible to change an attribute parameter of a displayed object by an easy and intuitive operation.

BRIEF DESCRIPTION OF DRAWINGS

FIG. 4 is a view showing a configuration of a clothing image information table and an example of data stored therein.
FIG. 5 is a view showing a configuration of a display control information storage unit and an example of data stored therein.
FIG. 6 is a view showing a configuration of a stock information storage unit and an example of data stored therein.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
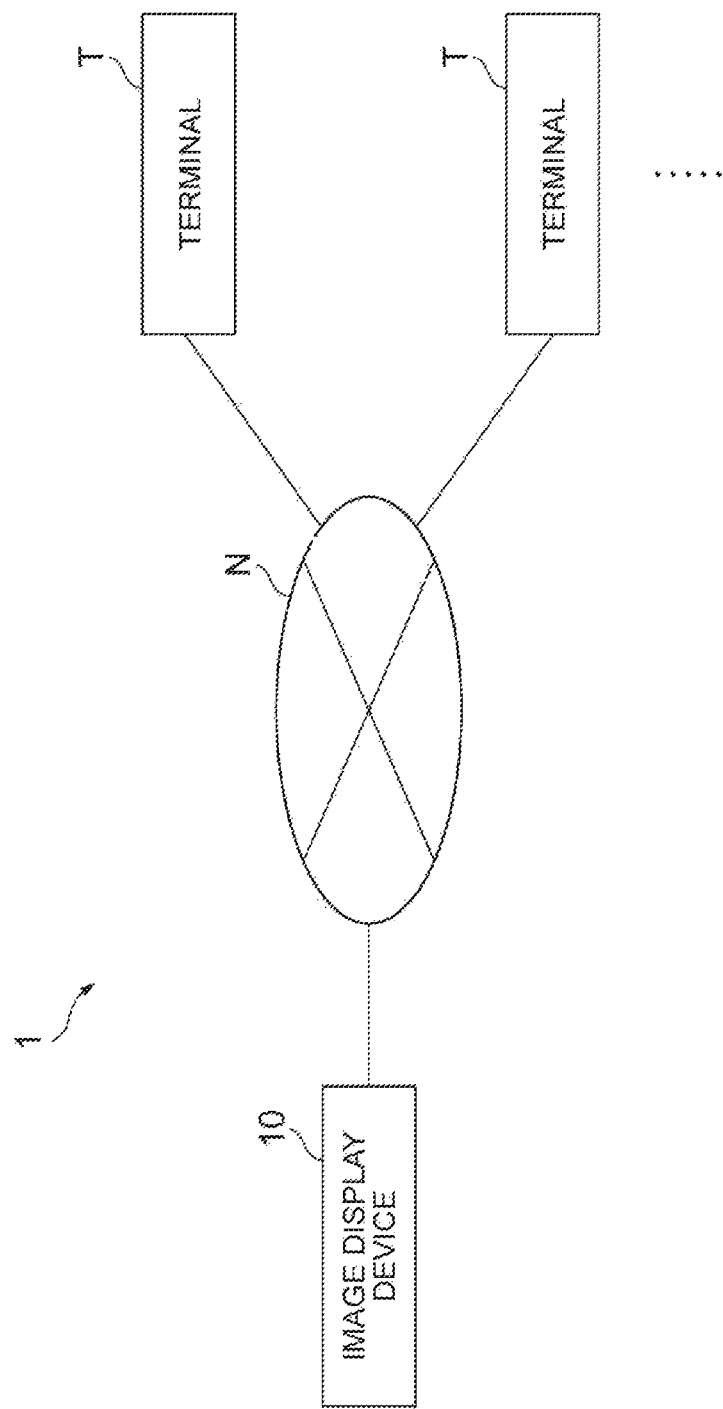
FIG. 1 is a view showing a configuration of a system including an image display device.

FIG. 1 is a view showing the configuration of an image display system 1 including an image display device 10 according to this embodiment. As shown in FIG. 1, the image display device 10 is connected to a terminal T of a user through a network N.

The image display device 10 is a device on an electronic commerce site that receives, from a user, an order of a product that is sold through a network, for example, and it displays information related to a sold product on the terminal T of the user.

The terminal T is a device operated by a user, and it transmits a request for a product search including search criteria specified by a user to the image display device 10, and displays a list of search results sent in response to the request. Further, the terminal T transmits information related to a product specified by the user from the search results to the image display device 10, and displays a clothing image, which is an image of the product sent in response to this information.

A device that constitutes the terminal T is not particularly limited. For example, it may be a stationary or portable personal computer, a mobile terminal such as an advanced mobile phone (smart phone), a cellular phone or a personal digital assistant (PDA) or the like. Although two terminals T are shown in FIG. 1, the number of terminals T is not limited thereto.

First Embodiment

Figure 2:
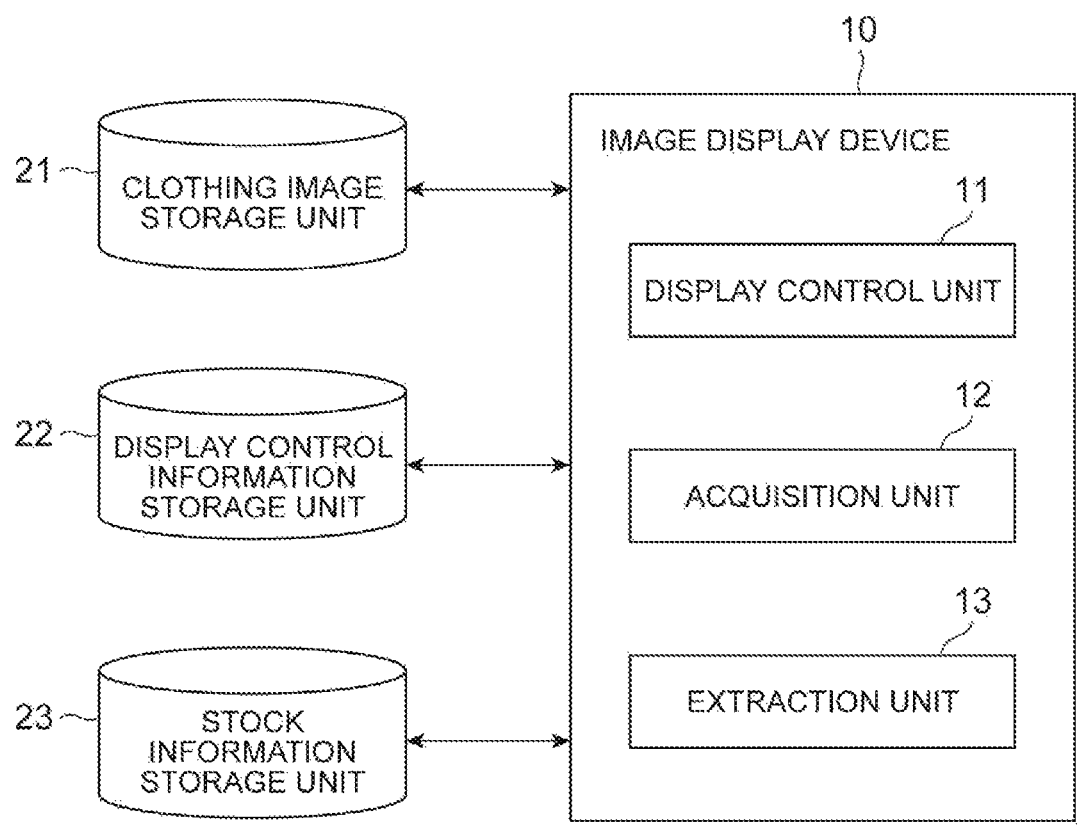
FIG. 2 is a block diagram showing a functional configuration of the image display device.

FIG. 2 is a block diagram showing the functional configuration of the image display device 10 according to this embodiment. The image display device 10 according to this embodiment is a device on an electronic commerce site that sells clothing. For example, the image display device 10 searches for clothing, which is a product, based on search criteria specified in the user terminal T, and displays a list of search results on the terminal T. Then, the image display device 10 displays, on a display device (display) of the terminal T, a clothing image of clothing specified from the search results in the terminal T.

As shown in FIG. 2, the image display device 10 functionally includes a display control unit 11 (display control means), an acquisition unit 12 (acquisition means), and an extraction unit 13 (extraction means). Further, the image display device 10 can access storage means such as a clothing image storage unit 21, a display control information storage unit, and a stock information storage unit 23. Note that each of the storage units 21 to 23 may be configured to be accessible from the image display device 10 through a network, or may be configured inside the image display device 10.

Figure 3:
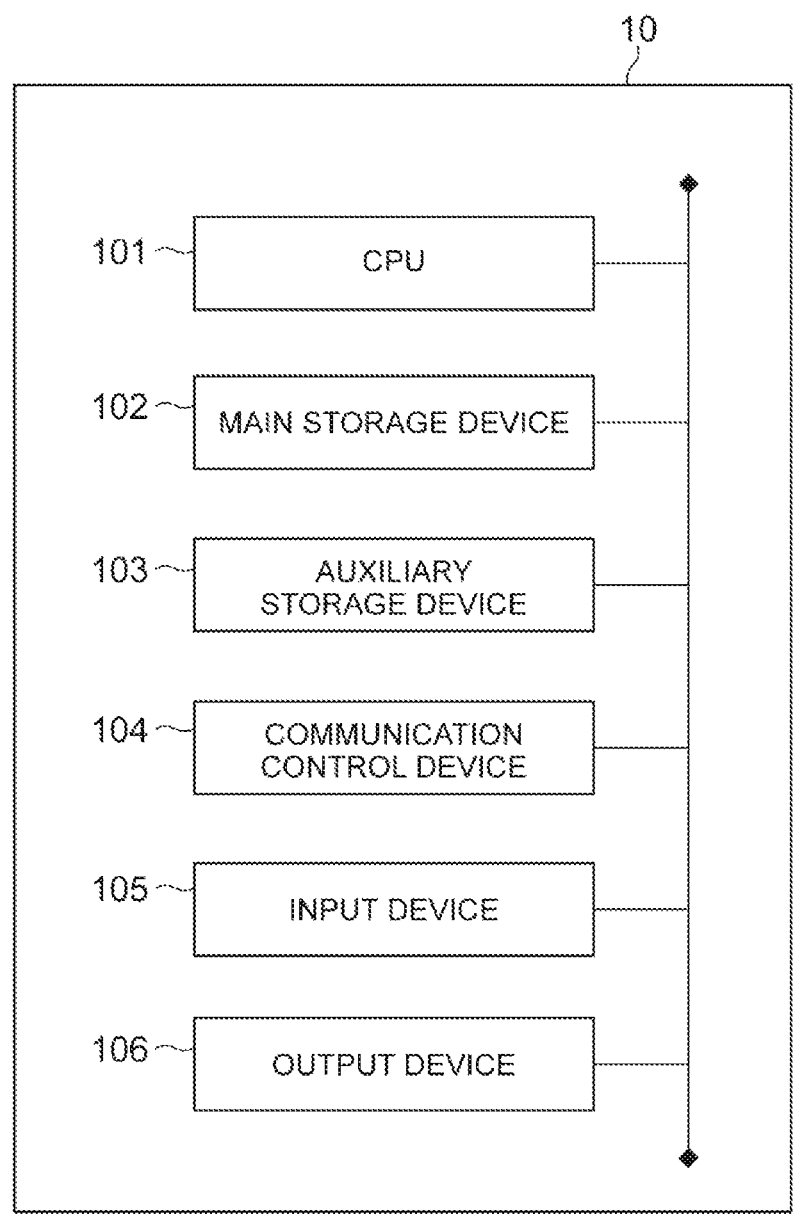
FIG. 3 is a view showing a hardware configuration of the image display device.

FIG. 3 is the hardware configuration diagram of the image display device 10. As shown in FIG. 3, the image display device 10 is physically configured as a computer system that includes a CPU 101, a main storage device 102 such as memory like RAM and ROM, an auxiliary storage device 103 such as a hard disk, a communication control device 104 such as a network card and the like. The information display device 1 may further include an input device 105 such as a keyboard and a mouse, an output device 106 such as a display and the like.

The functions shown in FIG. 2 are implemented by loading given computer software onto hardware such as the CPU 101 or the main storage device 102 shown in FIG. 3, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

Further, the terminal T may be also physically configured as a computer system having the hardware configuration as shown in FIG. 3.

Prior to describing the functional units of the image display device 10, the clothing image storage unit 21, the display control information storage unit 22 and the stock information storage unit 23 are described with reference back to FIG. 2.

In the case where the image display device 10 is configured on an electronic commerce site that sells clothing as a product as described above, the clothing image storage unit 21 stores a clothing image information table 21T that contains clothing images of clothing, which is a product, and various information related to the clothing images.

FIG. 4 is a view showing the configuration of the clothing image information table 21T and an example of data stored therein. As shown in FIG. 4, the clothing image information table 21T stores an attribute 1 (size), an attribute 2, image data and measurement data for each clothing ID that identifies the type of clothing as a product. The attribute 1 indicates variations on the attribute value of the size of the clothing. For example, clothing with the clothing ID "C1" has a size as the attribute, and variations on the attribute value of the size include S, M and L. The attribute 2 indicates variations on the attribute value of an attribute other than the size of the clothing. For example, clothing with the clothing ID "C2" has a length as the attribute, and variations on the attribute value of the length includes "medium" and "long".

The image data is data of clothing images, which are associated for each of the clothing having each attribute. For example, data of a clothing image of clothing with the clothing ID "C1" having the attribute of the size "S" is "G11". Image data of clothing images of each clothing is stored together with the clothing image information table 21T in the clothing image storage unit 21 as described above.

The measurement data contains information related to measurements of each part of clothing shown in each clothing image. For example, in the case where clothing shown in a clothing image is a shirt, the measurement data of the clothing image contains a length, a chest, a waist, a sleeve and the like. The measurement data is used when displaying a clothing image to be imposed on a human body model image by matching the scale.

The display control information storage unit 22 is a storage means that, for each clothing ID that identifies clothing, stores information related to an input operation for changing a clothing image to be displayed. FIG. 5 is a view showing the configuration of the display control information storage unit 22 and an example of data stored therein. Processing using information stored in the display control information storage unit 22 is described in detail later.

The stock information storage unit 23 is a storage means that stores the stock quantity of clothing. To be specific, the stock information storage unit 23 stores the stock quantity for each size and each attribute of each clothing. FIG. 6 is a view showing the configuration of the stock information storage unit 23 and an example of data stored therein. For example, the stock quantity of clothing with the clothing ID "C1" in the size "S" is "M11".

Figure 7:
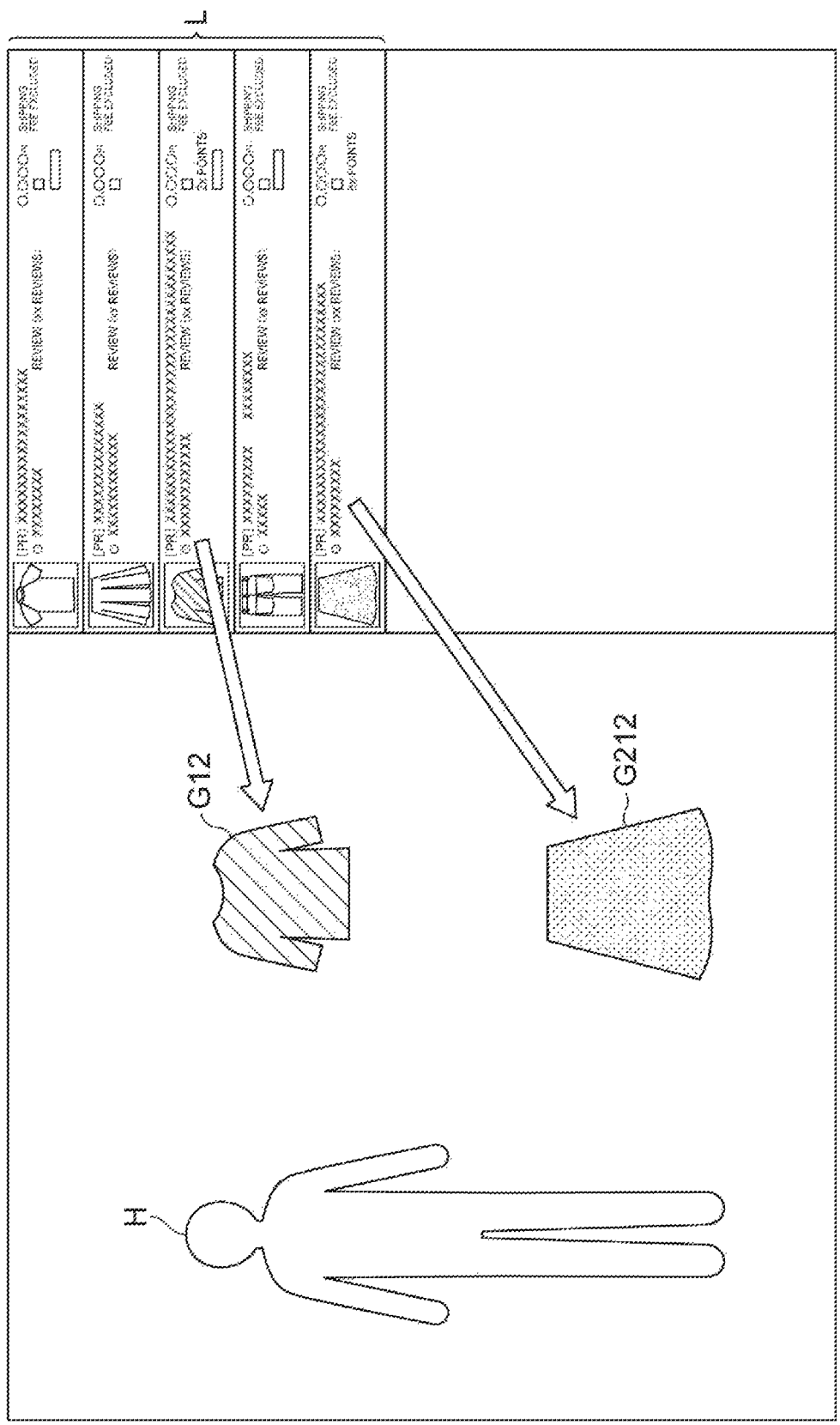
FIG. 7 is a view showing an example of a display screen on which a clothing image is displayed.

Referring back to FIG. 2, the functional units of the image display device 10 are described hereinafter. The display control unit 11 is a part that displays a clothing image on the display device. In this embodiment, the display control unit 11 displays various images including clothing images and information on the display device of the terminal T. FIG. 7 is a view showing an example of a display screen on which a clothing image is displayed.

In the case where the image display device 10 is configured on an electronic commerce site that sells clothing as a product as described above, the display control unit 11 displays, on the display device of the terminal T, a list L of clothing retrieved based on search criteria specified by the terminal T of a user, for example, as shown in FIG. 7.

Further, the display control unit 11 extracts a clothing image (display object) of clothing that is specified from the list L in the terminal T from the clothing image storage unit 21 and displays it on the terminal T. In the example shown in FIG. 7, the display control unit 11 displays, as a first clothing image, the clothing image G12 showing a shirt with the clothing ID "C1" and the size "M" and the clothing image G212 showing a skirt with the clothing ID "C2", the size "M" and the attribute 2 "medium".

Further, the display control unit 11 may display a human body model image H representing a user. The size of each part in the human body model image is adjusted based on information about the physical size of a user which is input or set in advance.

Figure 8:
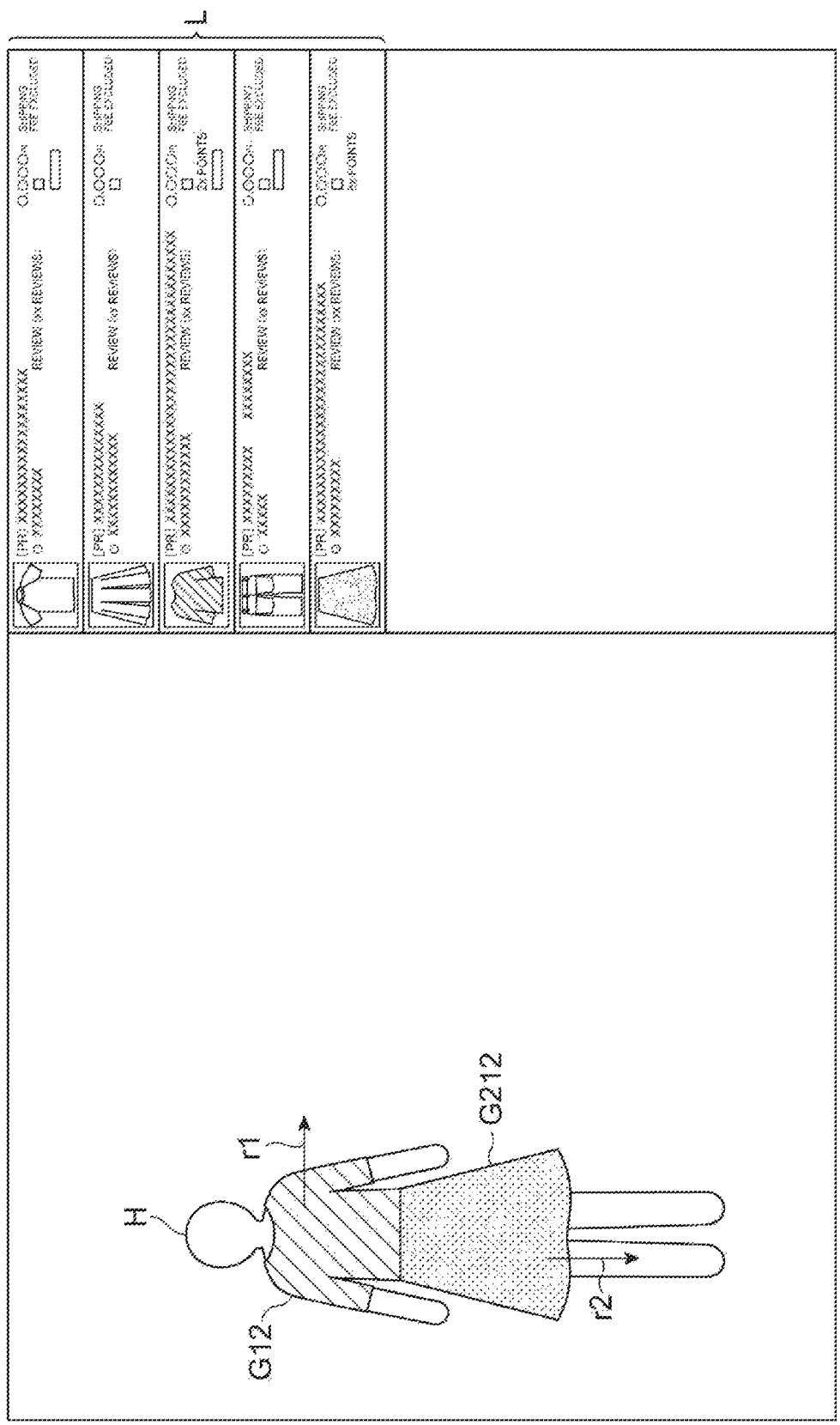
FIG. 8 is a view showing an example where a clothing image is displayed superimposed on a human body model image and an example of an input operation.

FIG. 8 is a view showing an example where a clothing image is displayed superimposed on a human body model image. When an operation to make the displayed clothing image closer to the human body model image is performed by a user in the terminal T, the display control unit 11 displays the clothing image to be superimposed on the human body model image. When displaying the clothing image to be superimposed on the human body model image, the display control unit 11 can carry out position adjustment.

To be specific, in the human body model image, a reference position indicating a specified part of a human body is set, for example. The specified part is a waist, a neck, a shoulder and the like, for example. Further, in the clothing image, a superposition reference position indicating a position to be superimposed on the specified part of the human body model image is set. For example, in the clothing image showing a shirt, the superposition reference position indicating a shoulder position is set. Further, in the clothing image showing a skirt, the superposition reference position indicating a waist position is set. The display control unit 11 displays the clothing image to be superimposed on the human body model image by setting the superposition reference position of the clothing image at the reference position indicating the corresponding part in the human body model image.

To be specific, as shown in FIG. 8, the display control unit 11 displays the clothing image G12 to be superimposed on the human body model image H by setting the superposition reference position indicating a shoulder position of the clothing image G12 showing a shirt at the reference position indicating a shoulder position in the human body model image H.

Further, the display control unit 11 displays the clothing image G212 to be superimposed on the human body model image H by setting the superposition reference position indicating a waist position of the clothing image G212 showing a skirt at the reference position indicating a waist position in the human body model image H.

Referring back to FIG. 2, the acquisition unit 12 acquires operation information containing the moving direction and the moving amount of an input position in an input operation on a first display object which is performed when the first display object is displayed on the display device. In this embodiment, the acquisition unit 12 acquires operation information related to an input operation performed when the first clothing image is displayed on the display device. The operation information contains the moving direction and the moving amount of an input position in this input operation. Acquisition of operation information is described hereinafter with reference to FIG. 8.

When an input operation as indicated by the arrow r1 is performed when the clothing image G12 as the first clothing image is displayed on the display device of the terminal T, the acquisition unit 12 acquires the operation information containing the moving direction and the moving amount of the input position. To be specific, the acquisition unit 12 acquires the rightward direction pointed by the arrow r1 and the amount corresponding to the length of the arrow r1 as the moving direction and the moving amount, respectively. Note that the acquisition unit 12 may acquire the moving direction as the direction of moving away from the center of the clothing image G12. Further, when an input operation as indicated by the arrow r2 is performed, the acquisition unit 12 acquires the operation information containing the moving direction and the moving amount of the input position. To be specific, the acquisition unit 12 acquires the downward direction pointed by the arrow r2 and the amount corresponding to the length of the arrow r2 as the moving direction and the moving amount, respectively.

Note that the acquisition unit 12 may acquire the input operation that is performed on the displayed first clothing image as the starting point or may acquire the input operation regardless of which position on the screen of the display device the starting point is.

Further, in the case where the display device of the terminal T is a touch panel, the input operation may be swiping on the tough panel. Further, the input operation may be dragging by an input device such as a mouse.

The extraction unit 13 is a part that, when the moving amount of an input position in a predetermined first direction exceeds a predetermined threshold, acquires a first attribute parameter of the first display object which corresponds to the first direction, and extracts a second display object associated with the first display object and having the first attribute parameter different from the first display object from a storage means in which a plurality of display objects are stored in association with attribute parameters. The display control unit 11 displays the second display object extracted by the extraction unit 13 on the display device instead of the first display object.

To be specific, when the moving amount of an input position in a first direction which is contained in the operation information exceeds a predetermined threshold, the extraction unit 13 extracts, as the second display object, a display object that is different in size from the first display object.

In this embodiment, when the moving amount of an input position in a predetermined direction which is contained in the operation information exceeds a predetermined threshold, the extraction unit 13 extracts, as a second clothing image, a clothing image in a different size from a first clothing image among clothing images associated with the first clothing image from the clothing image storage unit 21 that stores a plurality of clothing images in difference sizes in association with one another. The display control unit 11 displays the second clothing image extracted by the extraction unit 13, instead of the first clothing image, on the display device.

In this embodiment, the extraction unit 13 extracts a clothing image by referring to control information stored in the display control information storage unit 22. As described earlier, the display control information storage unit 22 stores, for each ID that identifies clothing, control information related to an input operation for changing a clothing image to be displayed.

To be specific, in the display control information storage unit 22, thresholds regarding the moving direction and the moving amount of an input position indicated by the operation information, an attribute to be changed, and the direction of change in the attribute are set in association with one another for each ID that identifies clothing as conditions to change a clothing image of the clothing into a clothing image associated with it.

For example, in the case where the movement of an input position in the operation information that is acquired when the clothing image with the clothing ID "C1" is displayed as the first clothing image is the movement in the direction "D11" with the moving amount exceeding the threshold "T11", the extraction unit 13 extracts a clothing image having an attribute of a larger size than the displayed clothing image from the clothing image storage unit 21.

Note that the direction "D11" is the direction of moving away from the center of the displayed first clothing image, and the direction "D12" is the opposite direction to the direction "D11", which is the direction of moving closer to the center of the displayed first clothing image.

The extraction unit 13 may extract a clothing image in a larger size than the first clothing image as the second clothing image when the moving amount of an input position in a predetermined direction exceeds a predetermined threshold, and may extract a clothing image in a smaller size than the first clothing image as the second clothing image when the moving amount of an input position in the direction opposite to the predetermined direction exceeds a predetermined threshold.

Such extraction of the second clothing image is described more specifically hereinafter with reference to FIGS. 8 and 9. An example where the operation information related to an input operation indicated by the arrow r1 in FIG. 8 is acquired by the acquisition unit 12 is described. In this example, in the case where the movement of the input position in the input operation (the arrow r1) that is performed when the clothing image G12 (in the size "M") is displayed on the display device is the movement along the direction "D11" with the moving amount exceeding the threshold "T11", the extraction unit 13 extracts the clothing image G13 in the size "L", which is larger than the size "M", among the clothing images with the clothing ID "C1".

Figure 9:
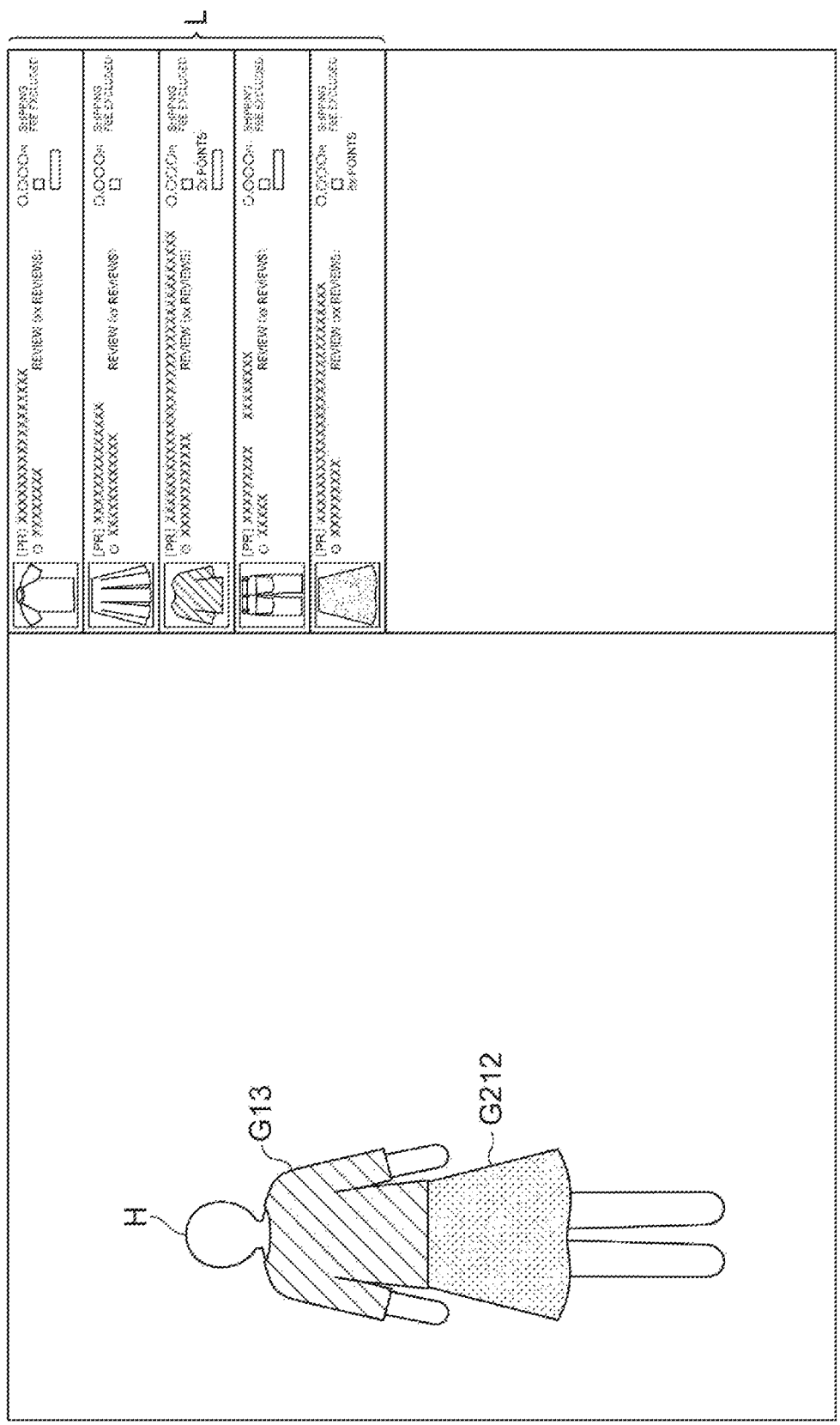
FIG. 9 is a view showing an example where a clothing image is changed.

Then, the display control unit 11 displays the clothing image G13, instead of the clothing image G12, on the display device of the terminal T as shown in FIG. 9. In this display, the display control unit 11 adjusts the size of the clothing image G13 so as to match the scale of the human body model image based on the measurement data E13. Further, the display control unit 11 displays the clothing image G13 by setting the superposition reference position indicating a shoulder position in the clothing image G13 at the reference position indicating a shoulder position in the human body model image.

Further, in the case where the movement of the input position in the input operation that is performed when the clothing image G13 (in the size "L") is displayed on the display device is the movement along the direction "D12", which is the direction opposite to the direction "D11", with the moving amount exceeding the threshold "T12", the extraction unit 13 extracts the clothing image G12 in the size "M", which is smaller than the size "L", among the clothing images with the clothing ID "C1".

Furthermore, in the case where the input operation along the direction "D11" with the moving amount exceeding twice the threshold "T11" is performed when the clothing image G11 in the size S is displayed, the extraction unit 13 extracts the clothing image G12 in the size M first when the moving amount of the input position exceeds the threshold "T11", and the display control unit 11 displays the extracted clothing image G12 instead of the clothing image G11 on the display device. Then, when the input position is further moved and the moving amount exceeds twice the threshold "T11", the extraction unit 13 extracts the clothing image G13 in the size L, and the display control unit 11 displays the extracted clothing image G13 instead of the clothing image G12 on the display device. In this manner, clothing images in different sizes can be displayed one after another only in one operation according to this embodiment, while a plurality of operations have been needed in the system according to related art.

As described above, a user can change the size of a displayed clothing image as desired by performing an input operation that moves an input position along a predetermined direction or performing an input operation that moves an input position along a direction opposite to a predetermined direction. It is thereby possible to easily change the size of a displayed clothing image by an intuitive operation.

Further, the extraction unit 13 may extract a clothing image in one level larger size or a clothing image in one level smaller size than the first clothing image as the second clothing image when the moving speed of the input position is lower than a predetermined speed, and may extract a clothing image in two or more levels larger size or a clothing image in two or more levels smaller size than the first clothing image as the second clothing image when the moving speed of the input position is higher than a predetermined speed.

To be specific, in the case where the movement of the input position in the direction "D11" with the moving amount exceeding the threshold "T11" and having the moving speed lower than a predetermined speed is acquired as the operation information by the acquisition unit 12 when the clothing image "G11" in the size "S" with the clothing ID "C1" is displayed as the first clothing image on the display device, the extraction unit 13 extracts the clothing image "G12" in the size "M", which is one level larger than the size "S", as the second clothing image.

On the other hand, in the case where the movement of the input position in the direction "D11" with the moving amount exceeding the threshold "T11" and having the moving speed equal to or higher than a predetermined speed is acquired as the operation information by the acquisition unit 12 when the clothing image "G11" in the size "S" with the clothing ID "C1" is displayed as the first clothing image on the display device, the extraction unit 13 extracts the clothing image "G13" in the size "L", which is two levels larger than the size "S", as the second clothing image. Note that, in the case where clothing in a still larger size than the size "L" is associated as the clothing with the clothing ID "C1", a clothing image of such clothing may be extracted in accordance with the moving speed of the input position.

Further, in the case where the input operation along the direction "D11" with the moving amount exceeding twice the threshold "T11" and the moving speed lower than a predetermined speed is performed when the clothing image G11 in the size S is displayed, the extraction unit 13 sequentially extracts the clothing image G12 in the size M and the clothing image G13 in the size L each time the moving amount of the input position exceeds the threshold "T11", and the display control unit 11 displays the extracted clothing image G12 and clothing image G13, switching them sequentially, on the display device. On the other hand, in the case where the input operation in the same direction with the same moving amount and the moving speed equal to or higher than a predetermined speed is performed, the extraction unit 13 extracts the clothing image G13 in the size L without extracting the clothing image G12 in the size M, and the display control unit 11 displays the extracted clothing image G13 instead of the clothing image G11 on the display device. It is thereby possible to reduce the processing load for transmitting, receiving and displaying data related to a clothing image which a user does not want to display, such as the clothing image G12 in the size M, and also reduce the processing time to display a desired clothing image.

Further, in the case where the movement of the input position in the direction "D12" with the moving amount exceeding the threshold "T12" and having the moving speed lower than a predetermined speed is acquired as the operation information by the acquisition unit 12 when the clothing image "G13" in the size "L" with the clothing ID "C1" is displayed as the first clothing image on the display device, the extraction unit 13 extracts the clothing image "G12" in the size "M", which is one level smaller than the size "L", as the second clothing image.

On the other hand, in the case where the movement of the input position in the direction "D12" with the moving amount exceeding the threshold "T12" and having the moving speed equal to or higher than a predetermined speed is acquired as the operation information by the acquisition unit 12 when the clothing image "G13" in the size "L" with the clothing ID "C1" is displayed as the first clothing image on the display device, the extraction unit 13 extracts the clothing image "G11" in the size "S", which is two levels smaller than the size "L", as the second clothing image. Note that, in the case where clothing in a still smaller size than the size "S" is associated as the clothing with the clothing ID "C1", a clothing image of such clothing may be extracted in accordance with the moving speed of the input position.

Because a clothing image is extracted in accordance with the moving speed of an input position as described above, and a user can determine the extent of changing the size of a displayed clothing image by changing the speed of the input position. Therefore, display of a desired size is achieved by an intuitive operation.

Further, although a threshold regarding the moving amount of an input position for extraction of the second clothing image is set for each clothing and attribute to be changed as shown in FIG. 5 in this embodiment, this threshold may be a constant value that is set in advance.

Further, this threshold may be set in accordance with the attribute value of a clothing image based on information about a user. Specifically, the extraction unit 13 may set a predetermined threshold for each size and at least one of attribute values other than the size of a clothing image based on information about a user related to an input operation.

To be specific, for example, the extraction unit 13 acquires purchase history information (not shown) of a user related to an input operation in an electronic commerce site where the image display device 10 is configured, acquires attributes such as the size of purchased clothing from the purchase history, and estimates the value of the clothing size which the user is likely to purchase. Then, the extraction unit 13 sets a threshold related to the moving amount of the input position of clothing images in the estimated size to be larger than clothing images in sizes other than the estimated size.

To be more specific, in the case where the size of clothing which a user is likely to purchase is estimated as "M", the extraction unit 13 sets a threshold related to the moving amount of an input position on the clothing image G12 in the size M to be greater than "T11". In this case, in the case where an input operation along the direction "D11" is performed when the clothing image G11 in the size S is displayed, the extraction unit 13 extracts the clothing image G12 in the size M first when the moving amount of the input position exceeds the threshold "T11", and the display control unit 11 displays the extracted clothing image G12 instead of the clothing image G11 on the display device. Then, even when the input operation is performed continuously and the moving amount of the input operation further exceeds the threshold "T11", the clothing image G12 in the size M continues to be displayed unless it does not exceed the threshold which is set greater than usual.

Another specific example in the case where the size of clothing which a user is likely to purchase is estimated as "M" and the extraction unit 13 sets a threshold related to the moving amount of an input position on the clothing image G12 in the size M to be greater than "T11" is described. Specifically, even in the case where an input operation along the direction "D11" with the moving amount exceeding twice the threshold "T11" and at the moving speed equal to or higher than a predetermined speed is performed when the clothing image G11 in the size S is displayed, the extraction unit 13 extracts the clothing image G12 in the size M, and the display control unit 11 displays the extracted clothing image G12 instead of the clothing image G11 on the display device unless the moving amount of the input position exceeds the sum of the threshold "T11" for the clothing image in the size S and a threshold (which is greater than T11) for the clothing image in the size M.

Further, because the human body model image H representing a user is adjusted based on information about the physical size of the user, the extraction unit 13 may estimate the size of clothing which the user is likely to purchase based on the information about the physical size of the user or the size of the human body model image H.

In this manner, by setting a threshold related to the moving amount of an input position in accordance with the attribute value of a clothing image based on information about a user, it is possible to perform control so as to facilitate display of a clothing image in a desired size of the user. Note that the estimation of the size of clothing which a user is likely to purchase can be achieved by various known techniques.

Further, the extraction unit 13 may extract a clothing image based on the stock information of displayed clothing and extracted clothing.

Specifically, in the case where a clothing image in a larger size than the first clothing image is extracted, when the stock information associated with the extracted clothing image indicates that the clothing shown in the clothing image is out of stock, the extraction unit 13 may re-extract a clothing image in a larger size than the extracted clothing image as the second clothing image.

To be specific, in the case where the movement of the input position in the direction "D11" with the moving amount exceeding the threshold "T11" is acquired as the operation information by the acquisition unit 12 when the clothing image "G11" in the size "S" with the clothing ID "C1" is displayed as the first clothing image on the display device, and the clothing image "G12" in the size "M", which is one level larger than the size "S", is extracted, for example, the extraction unit 13 acquires the stock information "M12" of clothing in the size "M" with the clothing ID "C1" by referring to the stock information storage unit 23, and when the stock information "M12" indicates that this clothing is out of stock, the extraction unit 13 re-extracts the clothing image "G13" in the size "L", which is larger than the clothing image "G12" in the size "M", as the second clothing image. Then, the display control unit 11 displays the re-extracted clothing image "G13", instead of the first clothing image, on the display device.

Further, in the case where a clothing image in a smaller size than the first clothing image is extracted, when the stock information associated with the extracted clothing image indicates that the clothing shown in the clothing image is out of stock, the extraction unit 13 may re-extract a clothing image in a smaller size than the extracted clothing image as the second clothing image.

To be specific, in the case where the movement of the input position in the direction "D12" with the moving amount exceeding the threshold "T12" is acquired as the operation information by the acquisition unit 12 when the clothing image "G13" in the size "L" with the clothing ID "C1" is displayed as the first clothing image on the display device, for example, the extraction unit 13 acquires the stock information "M12" of clothing in the size "M" with the clothing ID "C1" by referring to the stock information storage unit 23, and when the stock information "M12" indicates that this clothing is out of stock, the extraction unit 13 re-extracts the clothing image "G11" in the size "S", which is smaller than the clothing image "G12" in the size "M", as the second clothing image. Then, the display control unit 11 displays the re-extracted clothing image "G11", instead of the first clothing image, on the display device.

By such control, when a clothing image of clothing that is out of stock is extracted, a clothing image in a still larger or smaller size than this clothing is re-extracted, and thus a clothing image of clothing that is out of stock is not displayed. It is thereby possible to prevent a clothing image of clothing that is out of stock from being presented to a user.

An example of display of a clothing image showing a skirt is specifically described hereinafter with reference to FIGS. 8 and 10. An example where the operation information related to the input operation indicated by the arrow r2 of FIG. 8 is acquired by the acquisition unit 12 is described hereinbelow. In this example, it is set in the display control information storage unit 22 that the attribute 2 is changed from medium to long in the case where the movement of the input position in the input operation (the arrow r2) that is performed when the clothing image "G212" (in the size "M" with the attribute 2 "medium") is displayed on the display device is the movement in the direction "D221" with the moving amount exceeding the threshold "T221", and therefore the extraction unit 13 extracts the clothing image G222 in the size "M" with the attribute 2 "long" that is associated with the clothing image G212 from the clothing images with the clothing ID "C2".

Figure 10:
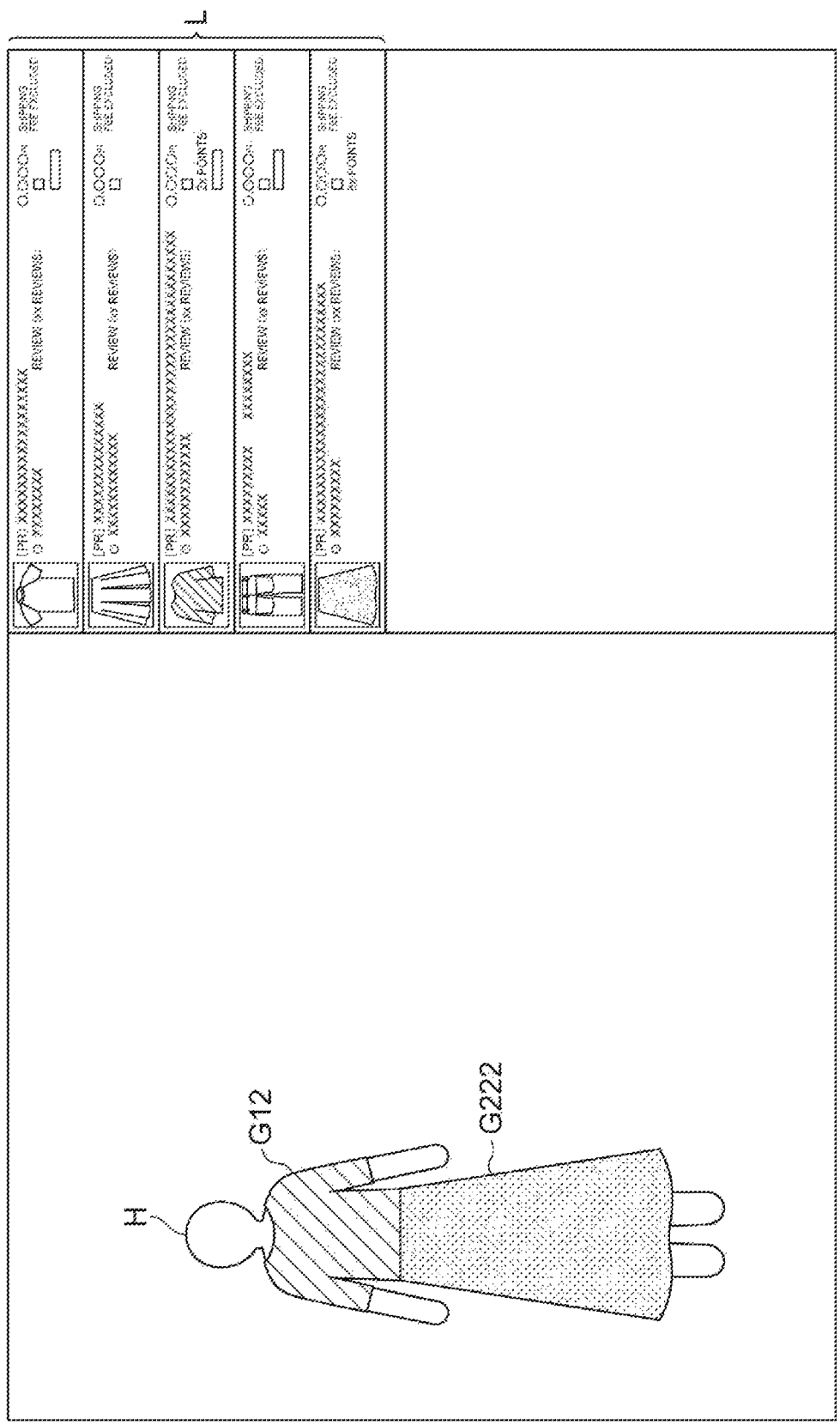
FIG. 10 is a view showing an example where a clothing image is changed.

Then, the display control unit 11 displays the clothing image G222, instead of the clothing image G212, on the display device of the terminal T as shown in FIG. 10. In this display, the display control unit 11 adjusts the size of the clothing image G222 so as to match the scale of the human body model image H based on the measurement data E222. Further, the display control unit 11 displays the clothing image G222 by setting the superposition reference position indicating a waist position in the clothing image G222 at the reference position indicating a waist position in the human body model image H.

Further, in the case where the movement of the input position in the input operation that is performed when the clothing image G222 (in the size "M" with the attribute 2 "long") is displayed on the display device is the movement along the direction "D222", which is the direction opposite to the direction "D221", with the moving amount exceeding the threshold "T222", the extraction unit 13 extracts the clothing image G212 in the size "M" with the attribute 2 "medium" that is associated with the clothing image G222 from the clothing images with the clothing ID "C2".

Although the second clothing image is different from the first clothing image in one type of attribute value in the embodiment described above, in the case where a clothing image has a plurality of attributes, and a plurality of clothing images with different attribute values of those attributes are stored in association with one another in the clothing image storage unit 21, the second clothing image with two or more types of attribute values may be extracted for the first clothing image, and displayed instead of the first clothing image.

Specifically, in the case where a clothing image has the size and another attribute other than the size, the extraction unit 13 may extract a clothing image having a size different from the first clothing image as the second clothing image when the moving amount of the input position along a first direction exceeds a predetermined first threshold, and may extract a clothing image having an attribute value of another attribute different from the first clothing image as the second clothing image when the moving amount of the input position along a second direction exceeds a predetermined second threshold.

To be specific, when the input operation that moves the input position diagonally in the lower right direction is performed in the clothing image G212 (in the size "M" with the attribute 2 "medium") displayed on the display device as shown in FIG. 8, for example, and the operation information related to this input operation is acquired by the acquisition unit 12, the extraction unit 13 extracts the moving amount in the crosswise (rightward) direction and the moving amount in the lengthwise (downward) direction from the acquired operation information. The extraction unit 13 determines whether the moving amount in the crosswise (rightward) direction exceeds the threshold T211 or not, and determines whether the moving amount in the lengthwise (downward) direction exceeds the threshold T221. When it is determined that the moving amount in the crosswise (rightward) direction exceeds the threshold T211 and the moving amount in the lengthwise (downward) direction exceeds the threshold T221, the extraction unit 13 extracts, as the second clothing image, the clothing image G223 in the size "L", which is larger than the size "M" of the clothing image G212, with the attribute 2 "long" (see FIG. 5) from the clothing images (see FIG. 4) associated with the clothing image G212.

As described above, because a clothing image having first and second attributes different from the first clothing image is displayed instead of the first clothing image, it is possible to display a clothing image having different attributes from the displayed first clothing image in one intuitive and easy operation. Further, because the second clothing image that is displayed instead of the first clothing image is extracted from clothing images that are stored in advance as variations on the attribute of this clothing, it is possible to display a clothing image with an actually existing attribute.

Note that, although the length of a skirt is set in addition to the size as the attribute of a clothing image in this embodiment, attributes such as a shirt shape ("slim, "regular") and a sleeve length ("long-sleeve", "short sleeve") may be set.

Further, although an example where a clothing image that is superimposed on the human body model image H is changed is described in this embodiment, a clothing image may be displayed alone without being superimposed on the human body model image H.

Figure 11:
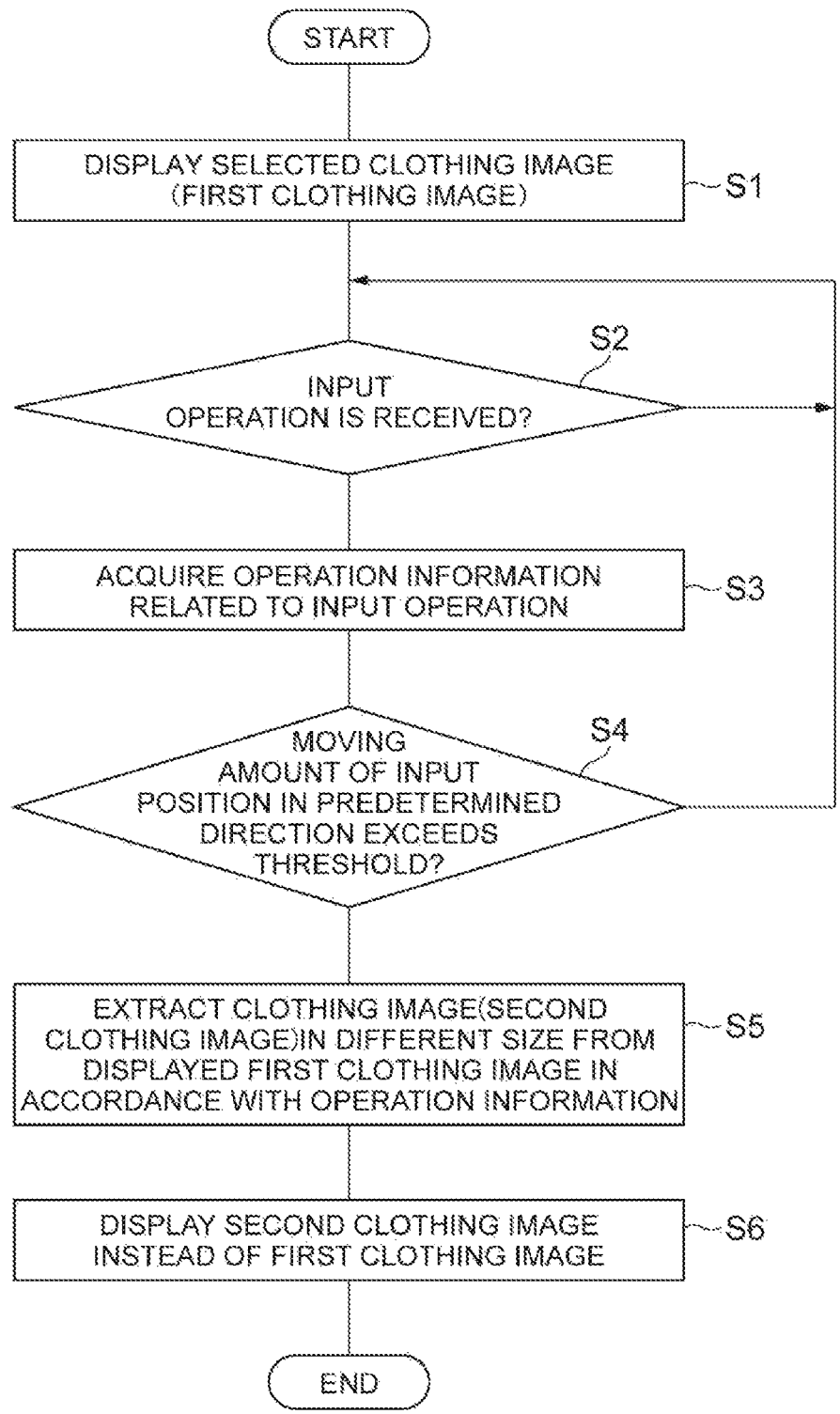
FIG. 11 is a flowchart showing a process of an image display method performed in the image display device.

The operation of the image display device 10 according to this embodiment is described hereinafter with reference to FIG. 11. FIG. 11 is a flowchart showing a process of an image display method performed in the image display device 10.

First, the display control unit 11 displays the first clothing image, which is a clothing image selected by a user, for example, on the display device of the terminal T (S1). Next, the acquisition unit 12 determines whether an input operation performed in the terminal on which the first clothing image is displayed is received or not (S2). When it is determined that the input operation is received, the process proceeds to Step S3. On the other hand, when it is not determined that the input operation is received, the determination in Step S2 is repeated.

In Step S3, the acquisition unit 12 acquires the operation information related to the input operation (S3). In the following Step S4, the extraction unit 13 determines whether the movement of the input position in a predetermined direction which is contained in the operation information acquired in Step S3 exceeds a predetermined threshold or not (S4). When it is determined that the movement of the input position in a predetermined direction exceeds a predetermined threshold, the process proceeds to Step S5. On the other hand, when it is not determined that the movement of the input position in a predetermined direction exceeds a predetermined threshold, the process returns to Step S2.

In Step S5, the extraction unit 13 extracts, as the second clothing image, a clothing image in a different size from the first clothing image among clothing images associated with the first clothing image from the clothing image storage unit 21 that stores a plurality of clothing images in different sizes in association with one another (S5).

Then, the display control unit 11 displays the second clothing image extracted by the extraction unit 13, instead of the first clothing image, on the display device of the terminal T (S6).

Figure 12:
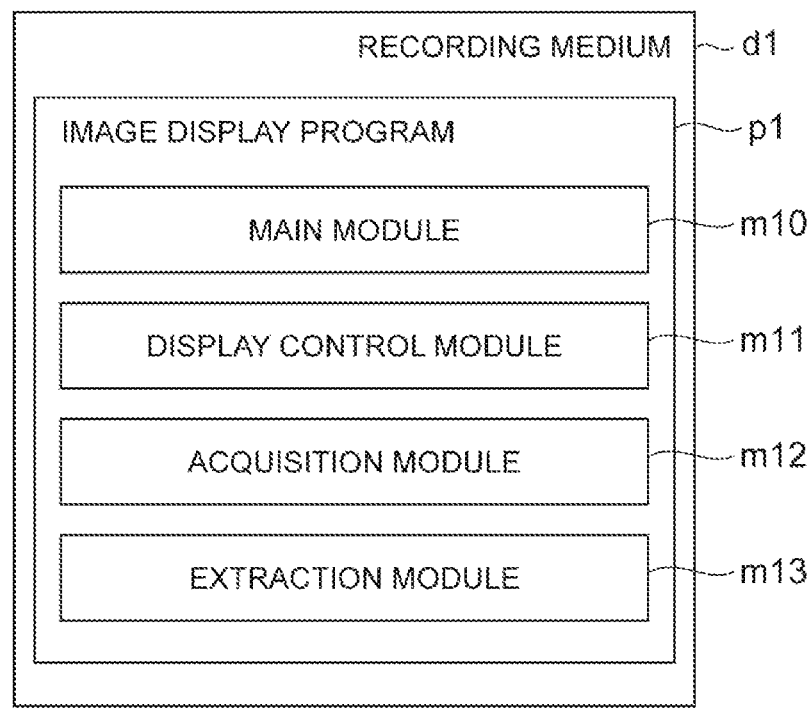
FIG. 12 is a view showing a configuration of an image display program.

An image display program that causes a computer to function as the image display device 10 is described hereinafter with reference to FIG. 12. An image display program p1 includes a main module m10, a display control unit m11, an acquisition module m12, and an extraction module m13.

The main module m10 is a part that exercises control over the image display process. The functions implemented by executing the display control unit m11, the acquisition module m12 and the extraction module m13 are respectively equal to the functions of the display control unit 11, the acquisition unit 12 and the extraction unit 13 of the image display system 1 shown in FIG. 1.

The image display program p1 is provided by a storage medium d1 such as CD-ROM, DVD-ROM or semiconductor memory, for example. Further, the image display program p1 may be provided as a computer data signal superimposed onto a carrier wave through a communication network.

In the image display system 1, the image display method and the image display program p1 according to this embodiment described above, in the case where an input operation performed when a first display image is displayed is acquired, and the moving amount of the input position in a predetermined direction exceeds a predetermined threshold, a clothing image in a different size from the first clothing image is displayed instead of the first clothing image, and therefore it is possible to change the size of the displayed clothing image by one operation that is intuitive and as easy as moving the input position in response to a request for a change in size. Further, because the second clothing image that is displayed instead of the first clothing image is extracted from clothing images that are prestored as variations on the size of this clothing, it is possible to display a clothing image in the actually existing size, differently from scale-up or scale-down processing of a displayed clothing image.

An embodiment of the present invention is described in detail above. However, the present invention is not limited to the above-described embodiment. Various changes and modifications may be made to the present invention without departing from the scope of the invention. Although the display control unit 11, the acquisition unit 12 and the extraction unit 13 are included in the image display device 10 in the image display system 1 according to this embodiment, some or all of those functional units 11 to 13 may be included in the terminal T.

Second Embodiment

Figure 13:
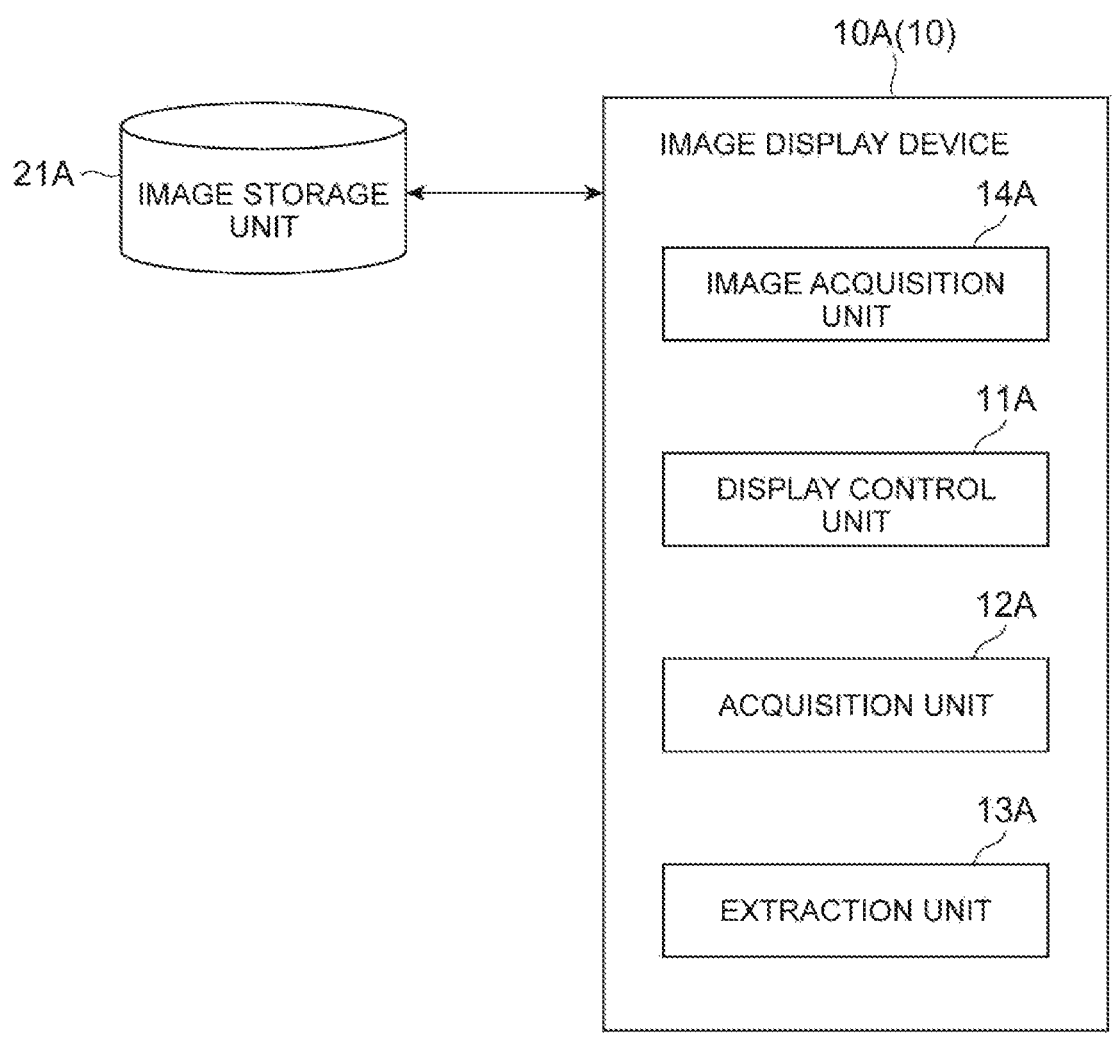
FIG. 13 is a block diagram showing a functional configuration of an image display device according to a second embodiment.

FIG. 13 is a block diagram showing the functional configuration of an image display device 10A (10) according to a second embodiment. The image display device 10A according to this embodiment is a device on an electronic commerce site that sells furniture such as shelves and sofas. For example, the image display device 10A searches for a shelf, which is one type of furniture, based on search criteria specified in the terminal T of a user, and displays shelf images (first display object) obtained as a search result on a display device (display) of the terminal T. Further, the image display device 10A may be a device on an electronic commerce site that sells drinking water, food and the like.

As shown in FIG. 13, the image display device 10A functionally includes a display control unit 11A (display control means), an acquisition unit 12A (acquisition means), an extraction unit 13A (extraction means), and an image acquisition unit 14A (image acquisition means). Further, the image display device 10A can access a storage means such as an image storage unit 21A. Note that the image storage unit 21A may be configured to be accessible from the image display device 10A through a network, or may be configured inside the image display device 10A.

Further, some or all of the functional units 11A to 14A in the image display device 10A may be included in the terminal T. Specifically, in the case where all of the functional units 11A to 14A are included in the terminal T, the image display system according to this embodiment is composed of the terminal T including the display control unit 11A, the acquisition unit 12A, the extraction unit 13A and the image acquisition unit 14A and the image storage unit 21A that is accessible from the terminal T through the network N. In the image display system according to this embodiment that is described with reference to FIG. 14 and the subsequent figures, an example where the display control unit 11A, the acquisition unit 12A, the extraction unit 13A and the image acquisition unit 14A are included in the terminal T is described. Note that the image display device 10A according to this embodiment and the terminal T are configured as a computer system having the hardware configuration as shown in FIG. 3.

Figure 14:
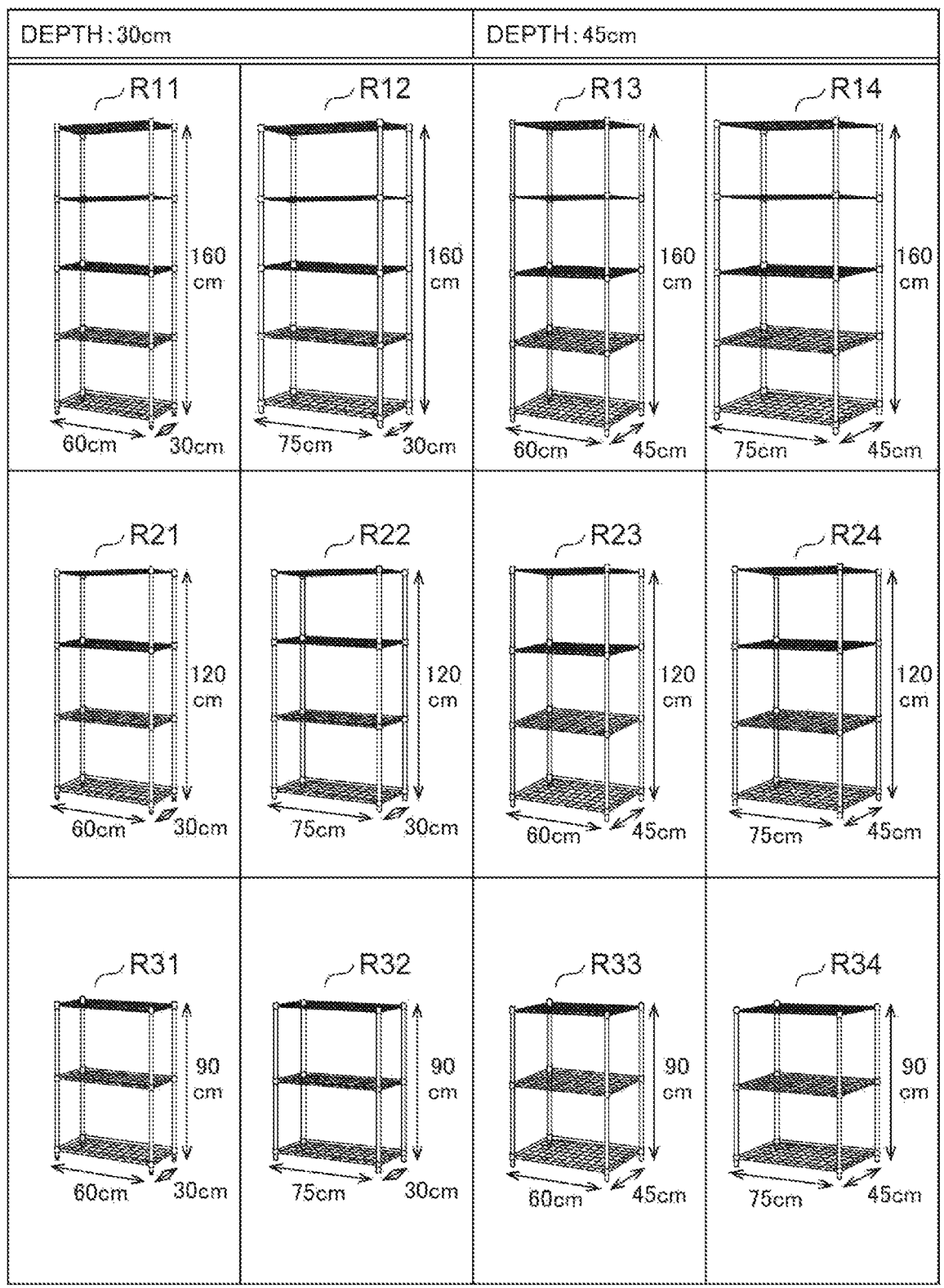
FIG. 14 is a view showing an example of display objects stored in an image storage unit.

The image storage unit 21A is described first with reference back to FIG. 13. FIG. 14 is a view showing an example of display objects stored in the image storage unit 21A. As shown in FIG. 14, the image storage unit 21A stores display objects R11 to R34, which are images showing shelves as products, for example. Each of the display objects has first to third attribute parameters. The first to third attribute parameters indicate the length along each of the coordinate axes in the three-axis coordinate system of an object represented by the display object. In this embodiment, the first to third attribute parameters are height (H), width (W) and depth (D), respectively, of a shelf represented by the display object. For example, the shelf represented by the display object R11 has height: 160, width: 60 and depth: 30 as the first to third attribute parameters, respectively.

Figure 15:
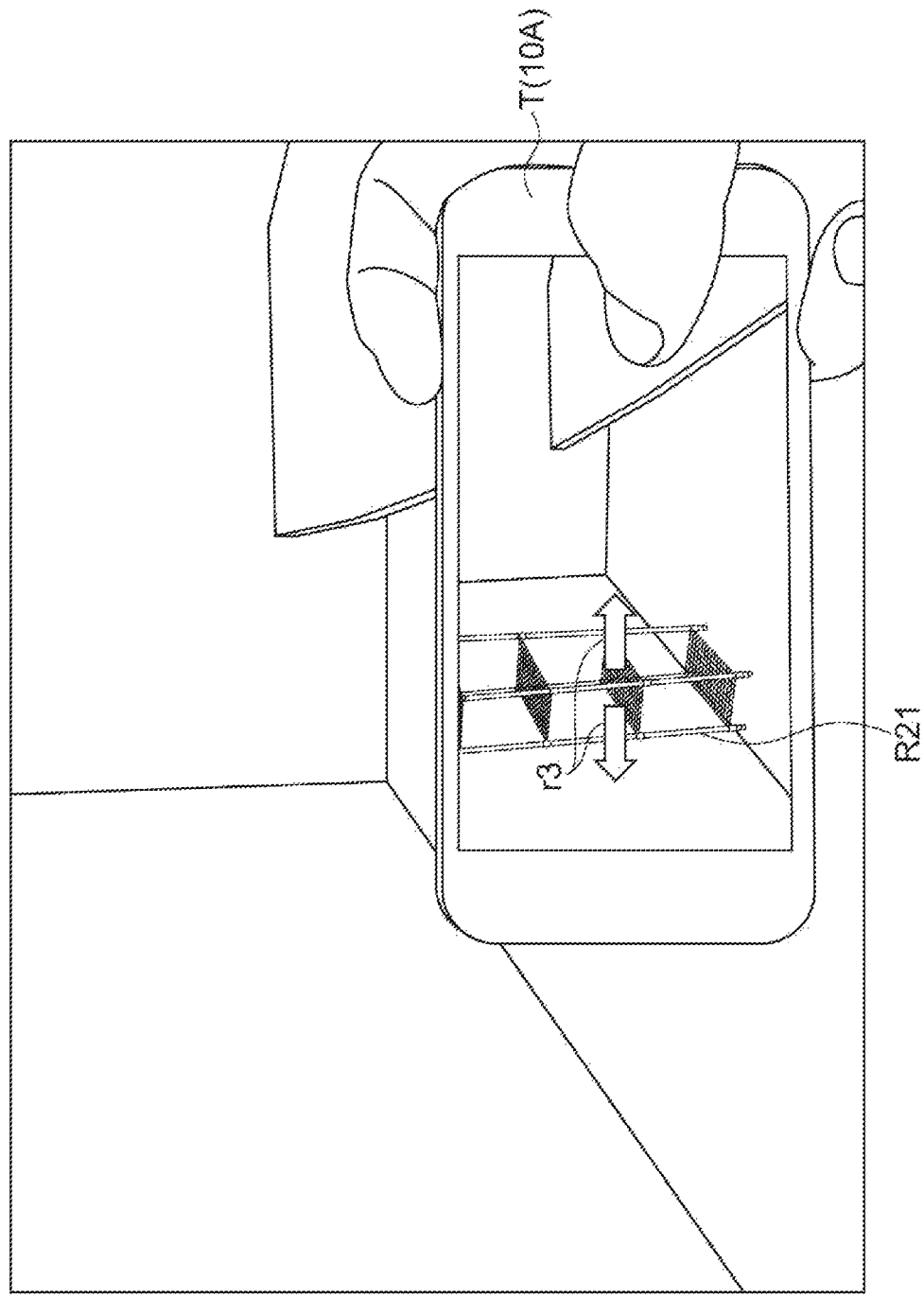
FIG. 15 is a view showing an example of a display screen displayed on a display device of a terminal.

The functional units 11A to 14A of FIG. 13 are described with reference to FIG. 15. FIG. 15 is a view showing an example of a display screen that is displayed on the display device of the terminal T. The image acquisition unit 14A acquires an image of a reality space. To be specific, the image acquisition unit 14A acquires the image of the reality space that is taken by a camera in the terminal T, for example. In the example shown in FIG. 15, the image acquisition unit 14A acquires an image showing a room in which the terminal T is located.

As shown in FIG. 15, the display control unit 11A displays the image of the reality space acquired by the image acquisition unit 14A on the display device of the terminal T. Further, the display control unit 11A displays the display object R21 to be superimposed on the image of the reality space. The display object R21 is selected by a user of the terminal T from a plurality of display objects stored in the image storage unit 21A, for example. The display control unit 11A may display the display object R21 at an arbitrary position specified by a user. Further, the display control unit 11A may display the display object R21 by placing the back surface of the shelf represented by the display object R21 on a wall surface detected from the reality space image.

When the input operation indicated by the arrow r3 is performed while the display object R21 (first display object) is displayed on the display device of the terminal T, the acquisition unit 12A acquires the operation information containing the moving direction and the moving amount of the input position. To be specific, the acquisition unit 12A acquires the fact that the arrow r3 indicates the crosswise direction (the direction along the depth of the display object R21) and the amount corresponding to the length of the arrow r3 as the moving direction and the moving amount, respectively.

Note that the acquisition unit 12A may acquire the input operation that is performed on the displayed first display object R21 as the starting point or may acquire the input operation regardless of which position on the screen of the display device the starting point is. Further, in the case where the display device of the terminal T is a touch panel, the input operation may be pinching or swiping on the tough panel. Further, the input operation may be dragging by an input device such as a mouse. For example, the arrow r3 in FIG. 15 indicates pinching corresponding to the lateral scale-up operation in the figure.

When the moving amount of the input position in any of predetermined first to third directions different from one another exceeds a predetermined threshold, the extraction unit 13A acquires, as the attribute parameter to be changed, at least one attribute parameter among the first to third attribute parameters in accordance with the coordinate axis corresponding to the moving direction of the input position based on the correspondence between the first to third axes in the object represented by the first display object and the first to third directions. The correspondence between the first to third axes in the object and the first to third directions is determined based on the orientation of the first display object that is displayed on the display device.

Figure 16:
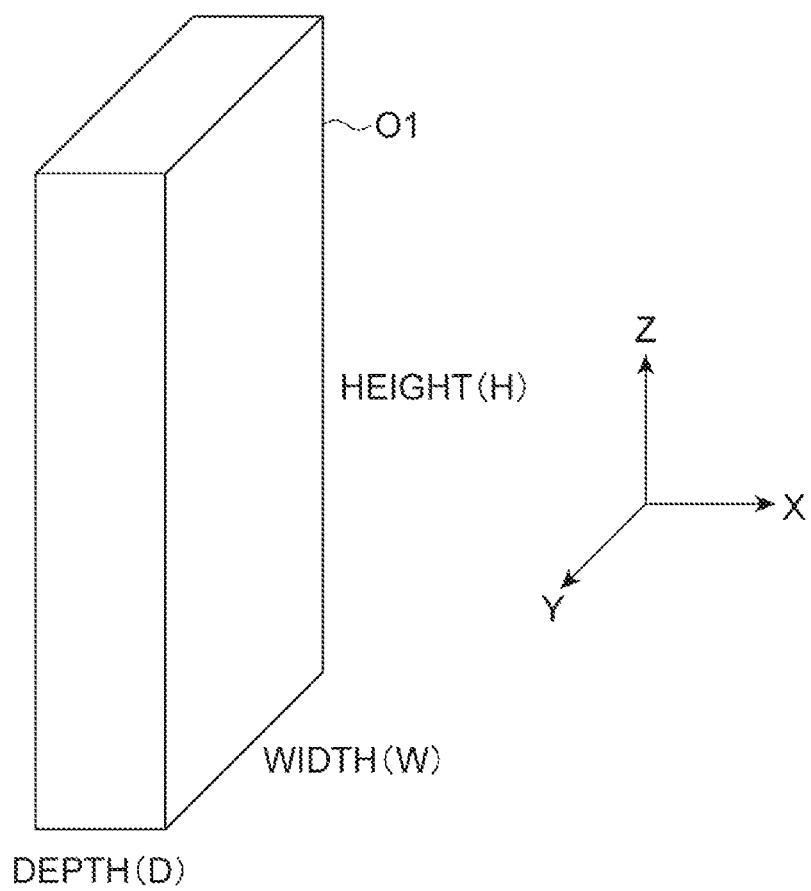
FIG. 16 is a view showing a display object displayed on the display device.

The acquisition of an attribute parameter by the extraction unit 13A is specifically described hereinafter with reference to FIGS. 16 and 17. FIG. 16 is a view showing a display object O1 that is displayed on the display device. As shown in FIG. 16, the display object O1 is displayed so that the depth (D), the width (W) and the height (H) respectively correspond to the X axis, the Y axis and the Z axis on the display screen. In the case where the input operation that moves along the X-axis direction (for example, pinching indicating scale-up or scale-down) is acquired by the acquisition unit 12A when the display object O1 is displayed in this manner, the extraction unit 13A acquires the depth (D) as the attribute parameter to be changed.

Likewise, in the case where the input operation that moves along the Y-axis direction is acquired by the acquisition unit 12A, the extraction unit 13A acquires the width (W) as the attribute parameter to be changed. In the case where the input operation that moves along the Z-axis direction is acquired by the acquisition unit 12A, the extraction unit 13A acquires the height (H) as the attribute parameter to be changed. The input operation that moves along each axis direction may be the operation of pinching indicating scale-up or scale-down or the operation of moving the input position in one direction along the axis direction (for example, swiping or dragging). Note that, in the recognition of the moving direction of the input operation in the extraction unit 13A, a certain margin of error may be allowed for each axis direction.

Figure 17:
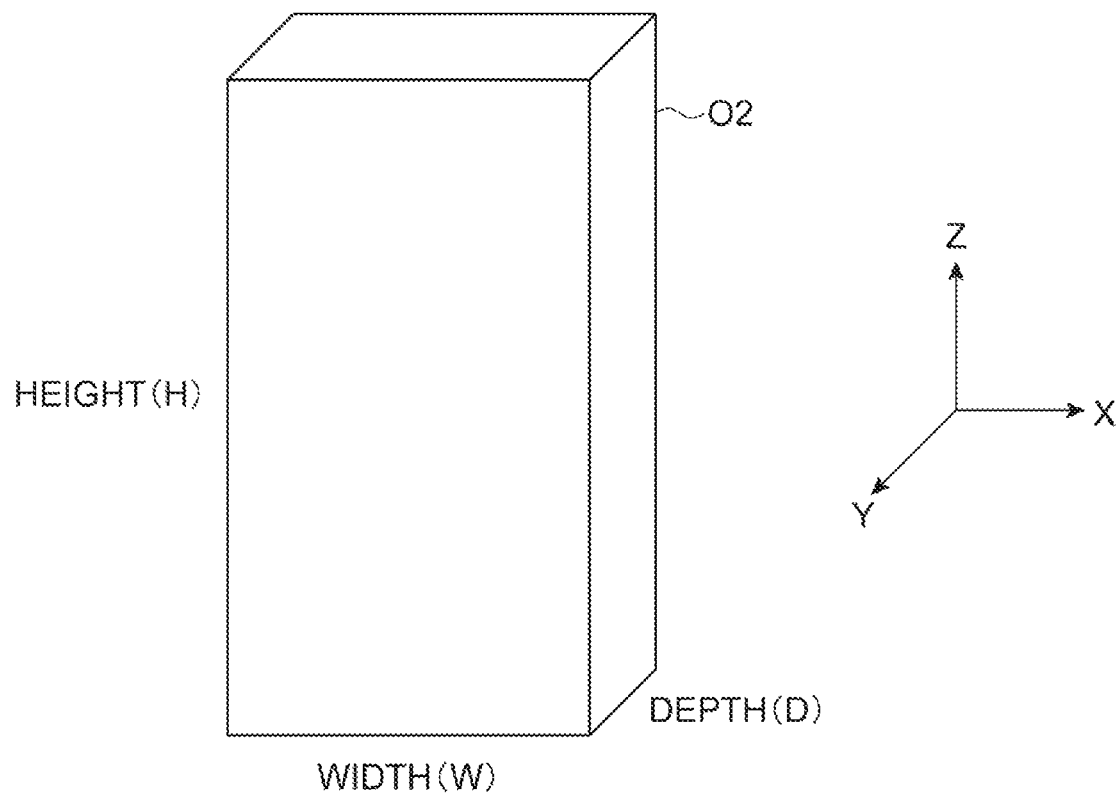
FIG. 17 is a view showing a display object displayed on the display device.

FIG. 17 is a view showing an example in the case where the correspondence between each axis direction and an attribute parameter is different from that in FIG. 16. As shown in FIG. 17, the display object O2 is displayed so that the width (W), the depth (D) and the height (H) respectively correspond to the X axis, the Y axis and the Z axis on the display screen. In the case where the input operation that moves along the X-axis direction is acquired by the acquisition unit 12A when the display object O2 is displayed in this manner, the extraction unit 13A acquires the width (W) as the attribute parameter to be changed.

Likewise, in the case where the input operation that moves along the Y-axis direction is acquired by the acquisition unit 12A, the extraction unit 13A acquires the depth (D) as the attribute parameter to be changed. In the case where the input operation that moves along the Z-axis direction is acquired by the acquisition unit 12A, the extraction unit 13A acquires the height (H) as the attribute parameter to be changed. Just like in FIG. 16, the input operation that moves along each axis direction may be the operation of pinching indicating scale-up or scale-down or the operation of moving the input position in one direction along the axis direction (for example, swiping or dragging).

Figure 18:
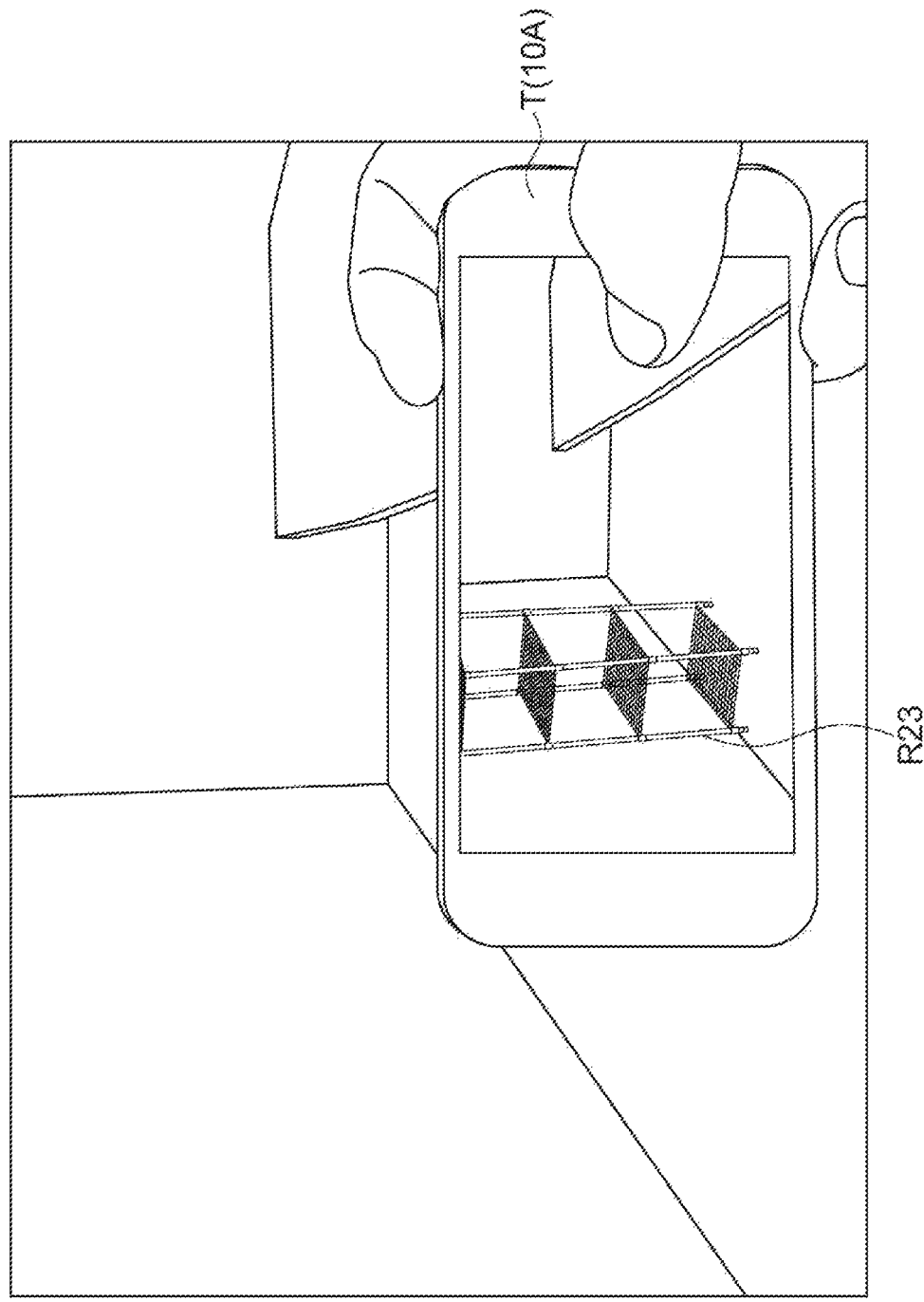
FIG. 18 is a view showing a second object displayed instead of the first display object.

Processing to display the second object instead of the first object is described hereinafter with reference to FIG. 18 and with reference back to FIG. 15. The extraction unit 13A extracts the second display object which is different from the first display object in at least one of the acquired first to third attribute parameters.

To be specific, in the case where the input operation (pinching indicating scale-up) where the moving amount exceeds a predetermined threshold is acquired by the acquisition unit 12A as shown in the arrow r3 in FIG. 15, because the moving direction of the input operation is along the X-axis direction and the depth (D) of the display object R21 corresponds to the X-axis direction, the extraction unit 13A acquires the depth (D) as the attribute parameter to be changed.

Then, the extraction unit 13A extracts, as the second display object, the display object where at least one value of the first to third attribute parameters has a value that is immediately larger or smaller than that of the first display object. To be specific, the extraction unit 13A extracts, as the second display object, the display object where the value of the depth (D) is a value that is immediately larger or smaller than the value of the display object R21.

Note that, in the case where pinching indicating scale-sown is acquired, the extraction unit 13A extracts the display object where the corresponding attribute parameter has a smaller value than that of the first display object R21. Further, in the case where the input operation that moves the input position in the direction going away from substantially the center of the first display object R21 is acquired, the extraction unit 13A may extract the display object where the corresponding attribute parameter has a larger value than that of the first display object R21, and in the case where the input operation that moves the input position in the direction coming closer to substantially the center of the first display object R21 is acquired, the extraction unit 13A may extract the display object where the corresponding attribute parameter has a smaller value than that of the first display object R21.

The extraction unit 13A extracts a display object that is associated with the first display object R21 in the image storage unit 21A (storage means). To be specific, the extraction unit 13A extracts, as the second display object, the display object R23 where the value of the depth (D) is larger than that of the display object R21 and the values of the width (W) and the height (H) are the same as those of the display object R21 from the display objects R11 to R34 (the image storage unit 21A shown in FIG. 14) associated with the first display object R21. Then, as shown in FIG. 18, the display control unit 11A displays the display object R23, instead of the display object R21, on the display device.

Further, the extraction unit 13A may extract the second display object by making a search, in the storage means, which at least contains, as search criteria regarding at least one of the first to third attribute parameters, a value obtained by adding a predetermined value to at least one value of the first to third attribute parameters of the first display object or a value obtained by multiplying the at least one value by a predetermined value. Note that the predetermined value for creating the search criteria may be a positive value or a negative value. Further, the predetermined value may be a value more than 1 or a value less than 1.

To be specific, the extraction unit 13A may extract the second object by making a search with search criteria containing the value of an attribute parameter when some or all of a plurality of display objects associated with attribute parameters are not associated with one another.

For example, in the case where the input operation indicated by the arrow r3 in FIG. 15 is acquired by the acquisition unit 12A, because the moving direction of the input operation is along the X-axis direction and the depth (D) of the display object R21 corresponds to the X-axis direction, the extraction unit 13A acquires the depth (D) as the attribute parameter to be changed. Further, because the input operation indicated by the arrow r3 is pinching indicating scale-up, a larger value than the value of the depth (D) of the display object R21 is set as search criteria regarding the depth (D).

The extraction unit 13A generates a value obtained by adding a predetermined value to the depth value 30 cm of the display object R21 or a value obtained by multiplying the depth value by a predetermined value as search criteria regarding the depth (D). For example, in the case where it is recognized by referring to the storage means that the depth of some of a plurality of associated display objects is distributed every 15 cm in the image storage unit 21A, the extraction unit 13A creates, as search criteria regarding the depth (D), the value 45 cm that is obtained by adding 15 cm to the value 30 cm of the depth (D) of the display object R21. Note that a predetermined value to be added to or multiplied by the value of an attribute parameter of the first display object for creating search criteria may be a value that is specified by a user or an arbitrary value that is preset in the system.

Then, the extraction unit 13A makes a search in the image storage unit 21A with the search criteria of the depth (D): 45 cm and the display object R21 width: 60 cm and height: 120 cm, and extracts the display object R23 as the second display object. Note that, in the case where any display object that matches the search criteria does not exist in the image storage unit 21A, the extraction unit 13A may make a search by widening the search criteria regarding each of a plurality of attribute parameters to include values in proximity to the set values. Further, in such a search, different weights may be assigned when widening the search range of each parameter.

Further, the extraction unit 13A may acquire constraints on the size of the object represented by the display object based on the image on which the display object is to be superimposed, and create search criteria based on the constraints. The image on which the display object is to be superimposed is the image showing the space where the object represented by the display object is to be placed, for example. To be specific, as described earlier with reference to FIGS. 15 and 18, the image acquisition unit 14A acquires the image of the reality space on which the display object is to be superimposed. Based on the image of the reality space, the extraction unit 13A can recognize various structures around the position where the object represented by the display object is to be placed.

The extraction unit 13A can recognize the wall surface, the floor surface, the table position and surface and the like in the acquired reality space image based on color information of the reality space image by using known image processing technology, for example. Further, in the case where the terminal T has a camera capable of acquiring depth information, such as an RGB-D camera, it is possible to acquire the distance to the object shown on the acquired image with higher accuracy. Furthermore, in the case where the terminal T has an acceleration sensor, by acquiring a plurality of images, changing the position of the terminal T, and tracking a feature point in the images, it is possible to acquire the distance to the object which the feature point belongs to based on a detected value by a gyro sensor.

The extraction unit 13A recognizes the size of the space around the position where the object represented by the display object is to be placed based on the various structures recognized from the reality space image, and acquires the size of the object that can be placed in the space of this size as constraints. Then, based on the acquired constraints, the extraction unit 13A creates search criteria for retrieving the second display object from the image storage unit 21A.

For example, in the case where it is recognized that the width of the space of the position where the object represented by the display object is to be placed is 70 cm based on the reality space image, the extraction unit 13A sets (width (W)<70 cm) as constraints, and creates search criteria to make a search in the image storage unit 21A based on the constraints. Because of such search criteria, shelves with the width (W) of 75 cm or more are not retrieved. By acquiring constraints and creating search criteria in this manner, it is possible to appropriately extract the object that can be placed in the space.

Further, the display control unit 11A may acquire constraints on the size of the object represented by the display object based on the image on which the display object is to be superimposed, and when the object represented by the second display object does not satisfy the constraints, may continue to display the first display object without displaying the second display object on the display device.

To be specific, because various structures around the position where the object represented by the display object is to be placed can be recognized based on the image of the reality space acquired by the image acquisition unit 14A, the display control unit 11A recognizes the size of the space around the position where the object represented by the display object is to be placed, and acquires the size of the object that can be placed in the space of this size as constraints. Then, in the case where the second display object extracted by the extraction unit 13A does not satisfy the constraints, the display control unit 11A continues to display the first display object without carrying out display of the second display object instead of the first display object.

For example, in the case where the length corresponding to the depth of the space of the position where the object represented by the display object is to be placed is recognized as 40 cm based on the image of the reality space, even when the display object R23 (depth: 45 cm) is extracted as the second display object by the extraction unit 13A, the display control unit 11A continues to display the display object R21 without displaying the display object R23 instead of the display object R21. It is thereby possible to prevent display of the second display object in an inappropriate size for the space where the object represented by the display object is to be placed.

The display control unit 11A may acquire a reference position regarding the placement of the object represented by the display object based on the image on which the display object is to be superimposed, and display the second display object to be superimposed on the image of the space by setting a superposition reference position indicating the position to be superimposed on the reference position in the second display object at the reference position.

To be specific, as described above, various structures around the position where the object represented by the display object is to be placed can be recognized based on the image of the reality space acquired by the image acquisition unit 14A. Then, the display control unit 11A acquires, from the reality space image, a wall surface position, a floor surface position and the like as the reference position related to the placement of the object. On the other hand, display objects that are stored in the image storage unit 21A can have, in addition to attribute parameters, a back surface to be placed along the wall surface, a bottom surface to be placed along the floor surface as the superposition reference position. As shown in FIG. 18, the display control unit 11A displays the display object R23 to be superimposed on the reality space image by placing the back surface and the bottom surface as the superposition reference position of the display object R23 on the wall surface and the floor surface as the reference position in the image of the reality space. In such display, the second display object is appropriately superimposed on the reality space image, and it is thereby possible to appropriately show the state where the object represented by the second display object is placed in the space.

Figure 19:
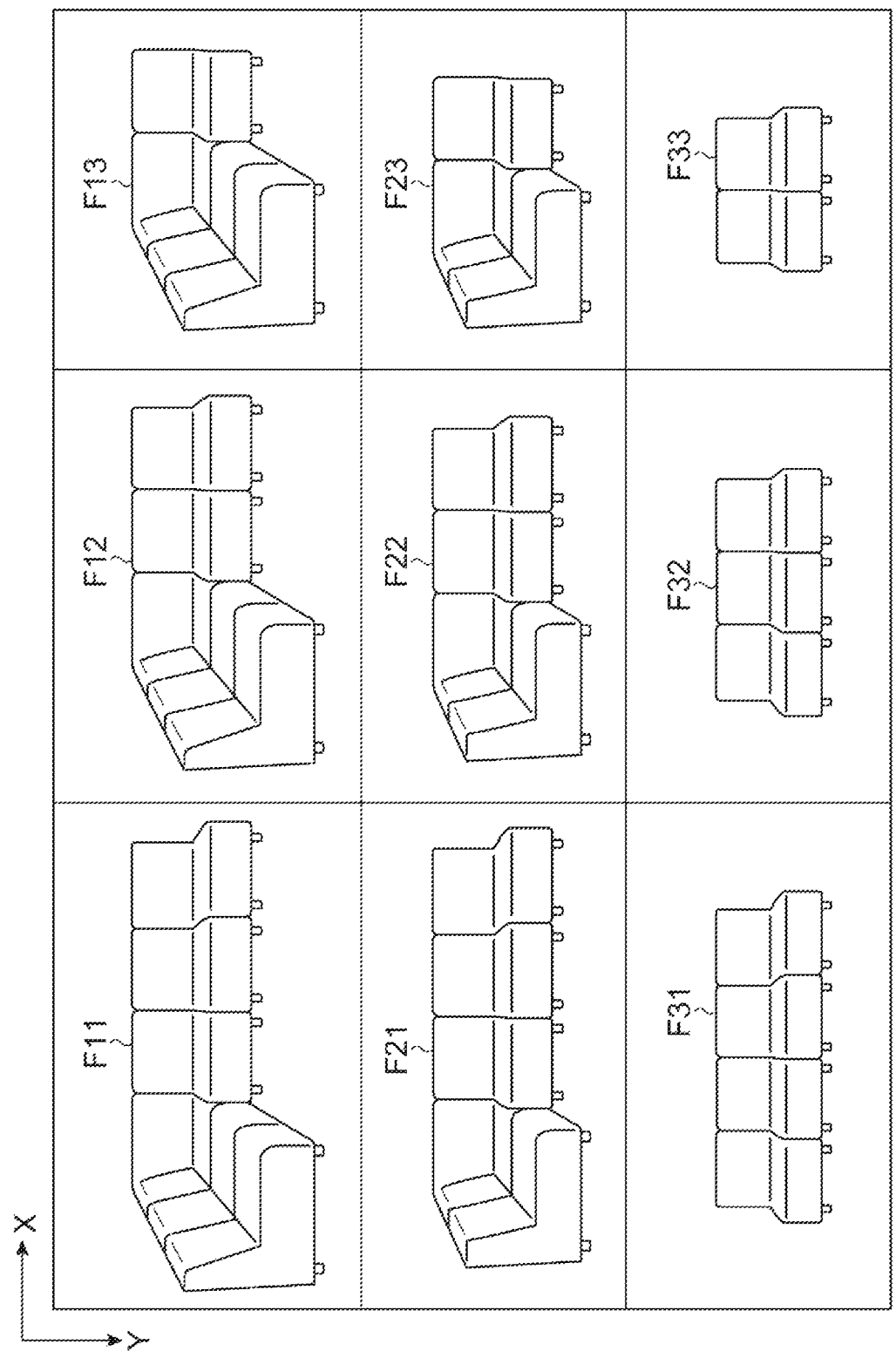
FIG. 19 is a view showing another example of display objects stored in the image storage unit.

Another example of display objects stored in the image storage unit 21A is described hereinafter with reference to FIG. 19. As shown in FIG. 19, the image storage unit 21A stores display objects F11 to F33 representing a sofa, which is one type of furniture, in association with one another. In those display objects, the number of component objects is associated as the attribute parameter. To be specific, in those display objects, the number of units in the horizontal direction of the figure (first attribute parameter) and the number of units in the depth direction of the figure (second attribute parameter) are associated as the attribute parameter.

For example, in the case where the display object F22 is displayed as the first display object on the display device by the display control unit 11A so that the horizontal direction and the depth direction of the figure respectively correspond to the X-axis direction (first direction) and the Y-axis direction (second direction) on the display screen, when the moving amount of an input operation along the X-axis direction exceeds a predetermined threshold, the extraction unit 13A acquires the number of units in the horizontal direction of the figure as the attribute parameter to be changed.

Then, when the moving amount of the input operation along the X-axis direction exceeds a predetermined threshold, the extraction unit 13A extracts, as the second display object, the display object having a different number of component objects from the first display object from the storage means. To be specific, in the case where pinching indicating scale-up along the X-axis direction is acquired, the extraction unit 13A extracts the display object F21 having a larger number of units in the horizontal direction than the display object F22. On the other hand, in the case where pinching indicating scale-down along the X-axis direction is acquired, the extraction unit 13A extracts the display object F23 having a smaller number of units in the horizontal direction than the display object F22. The display control unit 11A displays the extracted display object F21 or F23, instead of the display object F22, on the display device.

Note that, in the case where the input operation that moves the input position in one direction along the X axis in the moving direction of going away from substantially the center of the display object F22 is acquired, the extraction unit 13A may extract the display object F21 having a larger number of units in the horizontal direction than the display object F22. Further, in the case where the input operation that moves the input position in one direction along the X axis in the moving direction of coming closer to substantially the center of the display object F22 is acquired, the extraction unit 13A may extract the display object F23 having a smaller number of units in the horizontal direction than the display object F22.

Further, in the case where the moving amount of the input operation along the Y-axis direction exceeds a predetermined threshold, the extraction unit 13A acquires the number of units in the depth direction of the figure as the attribute parameter to be changed. In the case where pinching indicating scale-up along the Y-axis direction is acquired, the extraction unit 13A extracts the display object F12 having a larger number of units in the depth direction than the display object F22. On the other hand, in the case where pinching indicating scale-down along the Y-axis direction is acquired, the extraction unit 13A extracts the display object F32 having a smaller number of units in the depth direction than the display object F22. The display control unit 11A displays the extracted display object F12 or F32, instead of the display object F22, on the display device.

Note that, in the case where the input operation that moves the input position in one direction along the Y axis in the moving direction of going away from substantially the center of the display object F22 is acquired, the extraction unit 13A extracts the display object F12 having a larger number of units in the depth direction than the display object F22. On the other hand, in the case where the input operation that moves the input position in one direction along the Y axis in the moving direction of coming closer to substantially the center of the display object F22 is acquired, the extraction unit 13A extracts the display object F32 having a smaller number of units in the depth direction than the display object F22.

Figure 20:
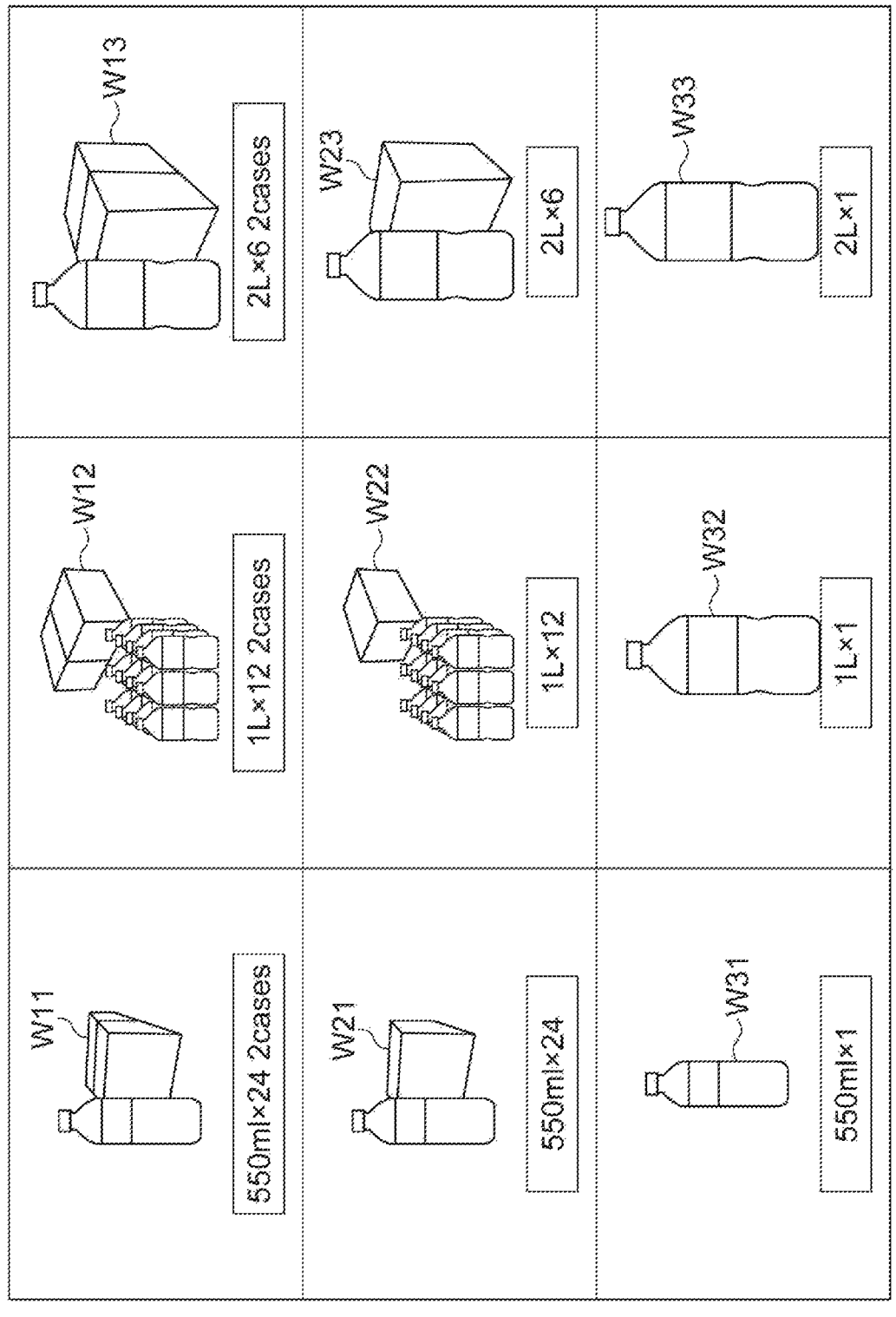
FIG. 20 is a view showing another example of display objects stored in the image storage unit.

Another example of display objects stored in the image storage unit 21A is described with reference to FIGS. 20 to 22. As shown in FIG. 20, the image storage unit 21A stores the display objects W11 to W33 representing mineral water in association with one another. In those display objects, the capacity of one bottle (first attribute parameter) and the number of bottles (second attribute parameter) are associated as the attribute parameter.

Figure 21:
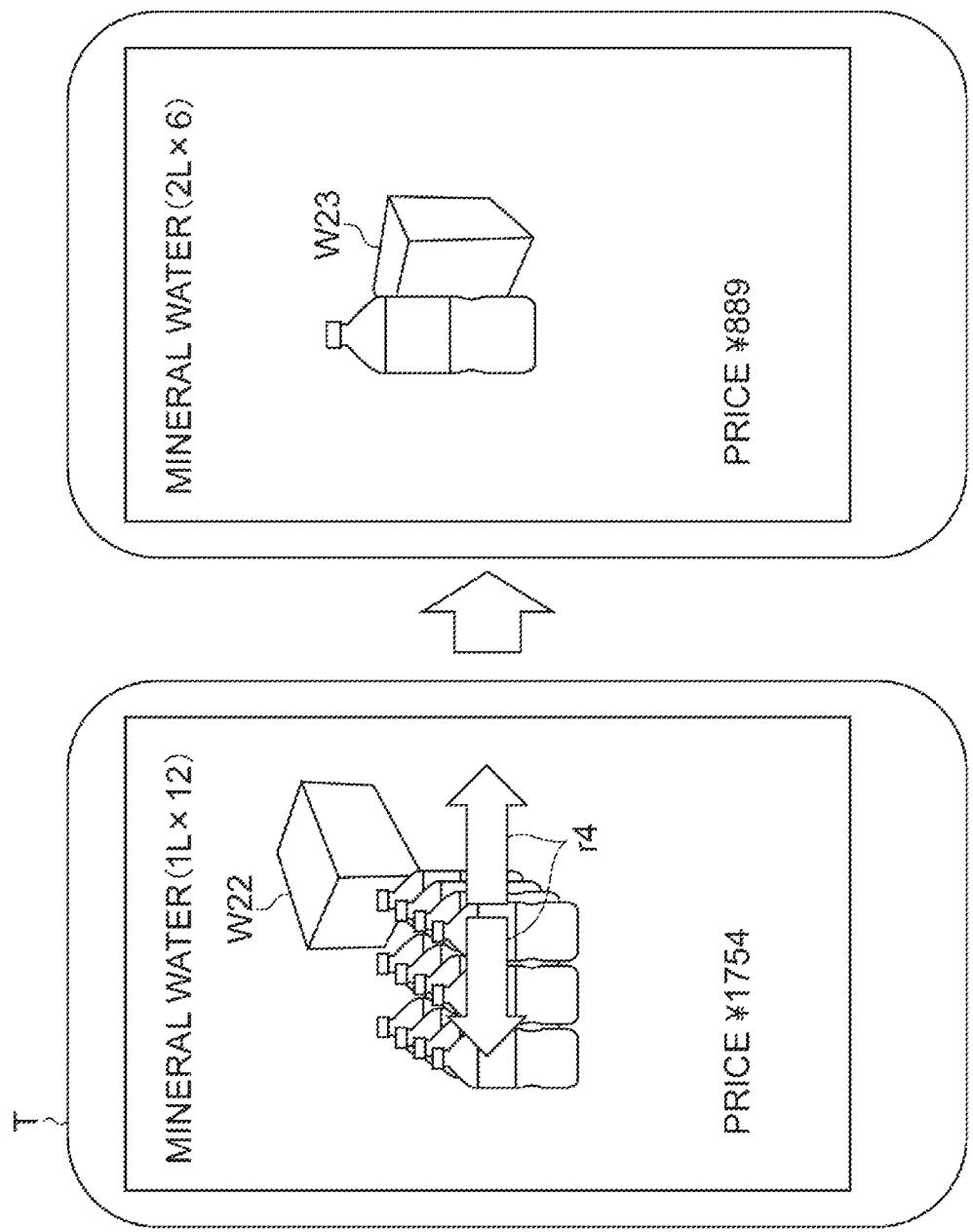
FIG. 21 is a view showing an example of a process where the second display object is displayed instead of the first display object.

For example, as shown in FIG. 21, in the case where the display object W22 is displayed as the first display object on the display device by the display control unit 11A, and the capacity of one bottle and the number of bottles are associated with the X-axis direction and the Y-axis direction, respectively, on the display screen, when the moving amount of the input operation along the X-axis direction exceeds a predetermined threshold as indicated by the arrow r4, the extraction unit 13A acquires the capacity of one bottle as the attribute parameter to be changed.

Then, because the input operation indicated by the arrow r4 is pinching indicating scale-up along the X-axis direction, the extraction unit 13A extracts the display object W23 having a larger capacity of one bottle than the display object W22. The display control unit 11A displays the extracted display object W23, instead of the display object W22, on the display device. Display of the price of a product represented by the display object may be changed in conjunction with a change of the display object.

Figure 22:
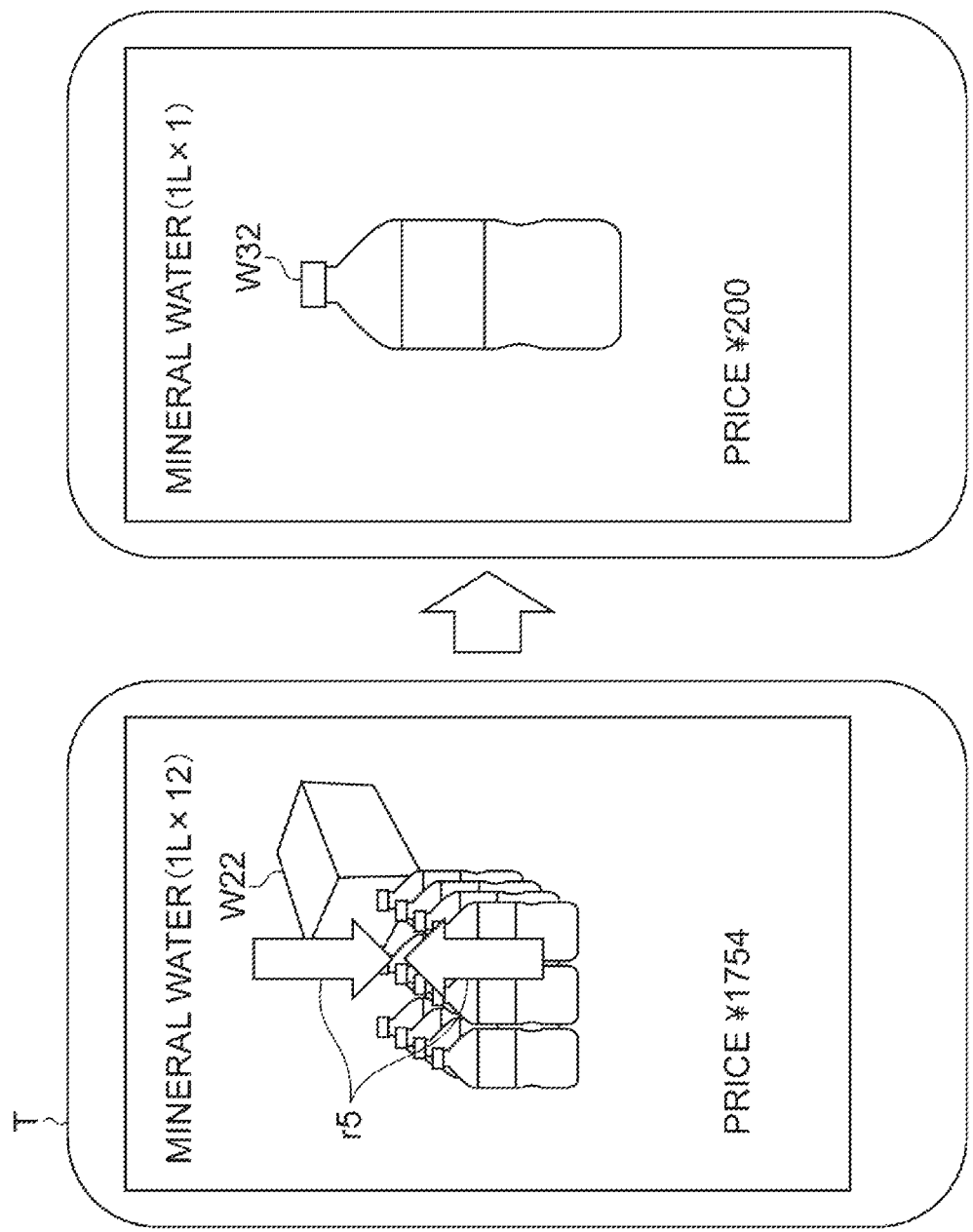
FIG. 22 is a view showing an example of a process where the second display object is displayed instead of the first display object.

Further, as shown in FIG. 22, in the case where the display object W22 is displayed as the first display object on the display device by the display control unit 11A, and the capacity of one bottle and the number of bottles are associated with the X-axis direction and the Y-axis direction, respectively, on the display screen, when the moving amount of the input operation along the Y-axis direction exceeds a predetermined threshold as indicated by the arrow r5, the extraction unit 13A acquires the number of bottles as the attribute parameter to be changed.

Then, because the input operation indicated by the arrow r5 is pinching indicating scale-down along the Y-axis direction, the extraction unit 13A extracts the display object W32 having a smaller number of bottles than the display object W22. The display control unit 11A displays the extracted display object W32, instead of the display object W22, on the display device. Display of the price of a product represented by the display object may be changed in conjunction with a change of the display object.

In the image display system, the image display method and the image display program according to the second embodiment described above, in the case where an input operation that is performed when a first display object is displayed is acquired, and the moving amount of the input position in predetermined first to third directions exceeds a predetermined threshold, a second display object different from the first display object in a variable attribute parameter acquired based on the correspondence between the first to third axes in the object and the first to third directions is extracted, and the extracted second display object is displayed on the display device. It is thereby possible to display the second display object, which is different from the first display object in any of the lengths along the first to third axes, in one intuitive and easy operation.

An embodiment of the present invention is described in detail above. However, the present invention is not limited to the above-described embodiment. Various changes and modifications may be made to the present invention without departing from the scope of the invention.

REFERENCE SIGNS LIST

1 . . . image display system, 10,10A . . . image display device, 11,11A . . . display control unit, 12,12A . . . acquisition unit, 13,13A . . . extraction unit, 14A . . . image acquisition unit, 21 . . . clothing image storage unit, 21A . . . image storage unit, 22 . . . display control information storage unit, 23 . . . stock information storage unit, m10 . . . main module, m11 . . . display control module, m12 . . . acquisition module, m13 . . . extraction module, p1 . . . image display program

The invention claimed is:

1. An image display system comprising:
   at least one memory configured to store computer program code; and
   at least one processor configured to access said at least one memory, read said computer program code, and operate as instructed by said computer program code, said computer program code including:
   acquisition code configured to cause at least one of said at least one processor to acquire operation information containing a moving direction and a moving amount of an input position in an input operation on a first display object, the input operation being performed when the first display object is displayed on a display device, wherein the input operation on the first display object includes one or more of a pinching on a touch panel, a swiping on the touch panel, or a dragging with a mouse;
   extraction code configured to cause at least one of said at least one processor to, when the moving amount of the input position in a predetermined first direction exceeds a predetermined threshold, acquire a first attribute parameter of the first display object which corresponds to the predetermined first direction, and extract a second display object associated with the first display object and having a first attribute parameter different from the first display object from a storage where a plurality of display objects are associated with attribute parameters; and
   display control code configured to cause at least one of said at least one processor to display the second display object extracted, instead of the first display object, on the display device,
   wherein:
   the first display object is a first clothing image,
   the storage is configured to store a plurality of clothing images in different sizes,
   the acquisition code is further configured to cause at least one of said at least one processor to acquire the operation information of the input operation on the first clothing image, the input operation being performed when the first clothing image is displayed on the display device,
   when the moving amount of the input position in a first direction contained in the operation information exceeds the predetermined threshold, the extraction code is configured to cause at least one of said at least one processor to extract, as a second clothing image, the second clothing image in a different size from the first clothing image among clothing images associated with the first clothing image from the storage, and
   the display control code is further configured to cause at least one of said at least one processor to display the second clothing image, instead of the first clothing image, on the display device.

2. The image display system according to claim 1, wherein
   the first attribute parameter relates to a size of the first display object or the number of component objects of the first display object, and when the moving amount of the input position in the predetermined first direction contained in the operation information exceeds the predetermined threshold, the extraction code causes at least one of said at least one processor to extract, as the second display object, a display object different in the size or a display object different in a number of component objects from the first display object from the storage.

3. The image display system according to claim 1, wherein
when the moving amount in a second direction different from the predetermined first direction exceeds the predetermined threshold, the extraction code causes at least one of said at least one processor to acquire acquires a second attribute parameter of the first display object which corresponds to the second direction, and extract the second display object associated with the first display object and having a second attribute parameter different from the first display object from the storage.

4. The image display system according to claim 1, wherein
when the moving amount of the input position in a predetermined direction exceeds the predetermined threshold, the extraction code causes at least one of said at least one processor to extract a clothing image in a larger size than the first clothing image as the second clothing image, and
when the moving amount of the input position in a direction opposite to the predetermined direction exceeds the predetermined threshold, the extraction code causes at least one of said at least one processor to extract a clothing image in a smaller size than the first clothing image as the second clothing image.

5. The image display system according to claim 4, wherein
when the moving speed of the input position is lower than a predetermined speed, the extraction code causes at least one of said at least one processor to extract a clothing image in one level larger size or a clothing image in one level smaller size than the first clothing image as the second clothing image, and
when the moving speed of the input position is equal to or higher than a predetermined speed, the extraction code causes at least one of said at least one processor to extract a clothing image in two or more levels larger size or a clothing image in two or more levels smaller size than the first clothing image as the second clothing image.

6. The image display system according to claim 1, wherein
the extraction code is configured to cause at least one of said at least one processor to set the predetermined threshold for each size and at least one of attribute values other than the size of a clothing image based on information about a user related to the input operation.

7. The image display system according to claim 1, wherein
the clothing image has a size as an attribute and another attribute other than the size,
a plurality of clothing images in different sizes and having different attribute values of the another attribute are associated with one another in the storage, and
when the moving amount of the input position in a first direction exceeds a predetermined first threshold, the extraction code causes at least one of said at least one processor to extract a clothing image in a different size from the first clothing image as the second clothing image, and
when the moving amount of the input position in a second direction exceeds a predetermined second threshold, the extraction code causes at least one of said at least one processor to extract a clothing image in a different attribute value of the another attribute from the first clothing image as the second clothing image.

8. The image display system according to Claim 1, wherein
a clothing image is associated with stock information regarding presence or absence of stock of clothing shown in the clothing image,
when a clothing image in a larger size than the first clothing image is extracted, and when stock information associated with the extracted clothing image indicates that clothing shown in the clothing image is out of stock, the extraction code causes at least one of said at least one processor to re-extract a clothing image in a larger size than the extracted clothing image as the second clothing image,
when a clothing image in a smaller size than the first clothing image is extracted and when stock information associated with the extracted clothing image indicates that clothing shown in the clothing image is out of stock, the extraction code configured to cause at least one of said at least one processor to re-extract a clothing image in a smaller size than the extracted clothing image as the second clothing image, and
the display control code is configured to cause at least one of said at least one processor to display the second clothing image re-extracted, instead of the first clothing image, on the display device.

9. The image display system according to claim 1, wherein
the display control code is configured to cause at least one of said at least one processor to display a human body model image representing a user related to the input operation on the display device based on information about a physical size of the user, and display the second clothing image to be superimposed on the human body model image.

10. The image display system according to claim 9, wherein
the human body model image has a reference position indicating a position of a specified part of a human body,
a clothing image has a superposition reference position indicating a position to be superimposed on the part, and
the display control code configured to cause at least one of said at least one processor to display the second clothing image to be superimposed on the human body model image by setting the superposition reference position at the reference position.

11. The image display system according to claim 1, wherein
the input operation is pinching, swiping or dragging on a screen where the first display object is displayed.

12. An image display system, the image display system comprising:
at least one memory configured to store computer program code; and
at least one processor configured to access said at least one memory, read said computer program code, and operate as instructed by said computer program code, said computer program code including:

acquisition code configured to cause at least one of said at least one processor to acquire operation information containing a moving direction and a moving amount of an input position in an input operation on a first display object, the input operation being performed when the first display object is displayed on a display device, wherein the input operation on the first display object includes one or more of a pinching on a touch panel, a swiping on the touch panel, or a dragging with a mouse;

extraction code configured to cause at least one of said at least one processor to, when the moving amount of the input position in a predetermined first direction exceeds a predetermined threshold, acquire a first attribute parameter of the first display object which corresponds to the predetermined first direction, and extract a second display object associated with the first display object and having a first attribute parameter different from the first display object from a storage where a plurality of display objects are associated with the first and third attribute parameters; and display control code configured to cause at least one of said at least one processor to display the second display object extracted, instead of the first display object, on the display device, wherein the first display object represents an object and has first to third attribute parameters respectively representing a length along each of coordinate axes in a three-axis coordinate system of the object, and when the moving amount of the input position in any of predetermined first to third directions different from one another exceeds the predetermined threshold, the extraction code causes at least one of said at least one processor to acquire at least one attribute parameter of the first to third attribute parameters in accordance with a coordinate axis corresponding to the moving direction of the input position based on correspondence between first to third axes in the object and the first to third directions, the correspondence being determined based on an orientation of the first display object displayed on the display device, and extract the second display object different from the first display object in the acquired at least one of the first to third attribute parameters, wherein the extraction code causes at least one of said at least one processor to extract, as the second display object, a display object associated with the first display object in the storage and where at least one of the first to third attribute parameters has a first value immediately larger or smaller than that of the first display object, or the extraction code causes at least one of said at least one processor to extract the second display object by making a search, in the storage, at least containing, as search criteria regarding at least one of the first to third attribute parameters, a second value obtained by adding a predetermined value to at least one value of the first to third attribute parameters of the first display object or a third value obtained by multiplying the at least one value by a predetermined value.

13. The image display system according to claim 12, wherein based on an image on which the first display object is to be superimposed, the image showing a space where an object represented by the first display object is to be placed, the extraction code causes at least one of said at least one processor to acquire constraints regarding a size of the object, and create the search criteria based on the constraints.

14. The image display system according to claim 12, wherein based on an image on which the first display object is to be superimposed, the image showing a space where an object represented by the first display object is to be placed, the display control code causes at least one of said at least one processor to acquire constraints regarding a size of the object, and when an object represented by the second display object does not satisfy the constraints, continue to display the first display object without displaying the second display object on the display device.

15. The image display system according to claim 12, wherein based on an image on which the first display object is to be superimposed, the image showing a space where an object represented by the first display object is to be placed, the display control code causes at least one of said at least one processor to acquire a reference position related to placement of the object, and display the second display object to be superimposed on the image of the space by setting a superposition reference position indicating a position to be superimposed on the reference position in the second display object at the reference position.

16. An image display method in an image display system, comprising:

acquiring operation information containing a moving direction and a moving amount of an input position in an input operation on a first display object, the input operation being performed when the first display object is displayed on a display device, wherein the input operation on the first display object includes one or more of a pinching on a touch panel, a swiping on the touch panel, or a dragging with a mouse;

when the moving amount of the input position in a predetermined first direction exceeds a predetermined threshold, acquiring a first attribute parameter of the first display object which corresponds to the predetermined first direction, and extracting a second display object associated with the first display object and having a first attribute parameter different from the first display object from a storage where a plurality of display objects are associated with attribute parameters; and displaying the second display object extracted, instead of the first display object, on the display device, wherein:

the first display object is a first clothing image, the image display system includes the storage, and the storage is configured to store a plurality of clothing images in different sizes, the acquiring further comprises acquiring the operation information of the input operation on the first clothing image, the input operation being performed when the first clothing image is displayed on the display device, when the moving amount of the input position in the predetermined first direction contained in the operation information exceeds the predetermined threshold, the acquiring a first attribute parameter further comprises extracting, as a second clothing image, a clothing image in a different size from the first clothing image among clothing images associated with the first clothing image from the storage, and displaying further comprises displaying the second clothing image extracted, instead of the first clothing image, on the display device.

17. A non-transitory computer-readable recording medium storing an image display program causing a computer to:
  acquire operation information containing a moving direction and a moving amount of an input position in an input operation on a first display object, the input operation being performed when the first display object is displayed on a display device, wherein the input operation on the first display object includes one or more of a pinching on a touch panel, a swiping on the touch panel, or a dragging with a mouse;
  when the moving amount of the input position in a predetermined first direction exceeds a predetermined threshold, acquire a first attribute parameter of the first display object which corresponds to the predetermined first direction, and extract a second display object associated with the first display object and having a first attribute parameter different from the first display object from a storage where a plurality of display objects are associated with attribute parameters; and
  display the second display object extracted instead of the first display object, on the display device,
  wherein:
  the first display object is a first clothing image,
  the storage of the computer is configured to store a plurality of clothing images in different sizes,
  the acquire operation includes acquiring the operation information of the input operation on the first clothing image, the input operation being performed when the first clothing image is displayed on the display device,
  when the moving amount of the input position in the predetermined first direction contained in the operation information exceeds the predetermined threshold, the acquire operation further includes extracting, as a second clothing image, a clothing image in a different size from the first clothing image among clothing images associated with the first clothing image from the storage, and
  the display includes displaying the second clothing image extracted, instead of the first clothing image, on the display device.

18. A method of performing e-commerce shopping by a shopper, the method comprising:
  receiving user description information input by the shopper on a user terminal operated by the shopper;
  receiving a selection of a first clothing item of a first size;
  displaying the first clothing item of the first size on a human model, wherein the human model is based on the user description information;
  receiving an input motion from the shopper on a screen of the user terminal, wherein the input motion includes a first motion or a second motion, wherein the input motion on the first clothing item includes one or more of a pinching on a touch panel, a swiping on the touch panel, or a dragging with a mouse;
  replacing a display of the first clothing item of the first size on the human model with the first clothing item of a second size;
  wherein the second size is larger than the first size if the input motion is the first motion, and the first motion is directed by the shopper away from the human model on the screen, and
  wherein the second size is smaller than the first size if the input motion is the second motion, and the second motion is directed by the shopper toward the human model on the screen.

19. The method of claim 18, wherein the first motion exceeds a rate of travel in a predetermined time in comparison with a threshold.

20. The method of claim 19, wherein the threshold is based on past user buying history.

21. A method of performing e-commerce shopping by a shopper, the method comprising:
  receiving, from a user terminal of the shopper, visual information of a room, wherein the user terminal includes a camera for capturing the visual information;
  receiving a selection of a first furniture item of a first size, wherein the first furniture item is a multi-piece sofa, and the first size is a first number of sofa units in the multi-piece sofa;
  displaying the first furniture item of the first size superposed on an image of the room, an entire image displayed on a screen of the user terminal, wherein an appearance of the room is based on the visual information of the room;
  receiving an input motion from the shopper on the screen of the user terminal operated by the shopper, wherein the input motion includes a position, a direction and an amount with respect to the first furniture item, wherein the input motion on the first furniture item includes one or more of a pinching on a touch panel, a swiping on the touch panel, or a dragging with a mouse; and
  replacing, based on the input motion, a display of the first furniture item of the first size on the image of the room with the first furniture item of a second size, wherein the second size is a second number of sofa units in the multi-piece sofa, and a difference between the second number of sofa units and the first number of sofa units is based on the input motion from the shopper.

22. A method of performing e-commerce shopping by a shopper, the method comprising;
  displaying first bottled water of a first bottle capacity and in terms of a first number of bottles, wherein the first number of bottles of the first bottle capacity corresponds to a first total volume of water;
  receiving an input motion from the shopper on a screen of a user terminal, wherein the input motion includes a first motion or a second motion, wherein the input motion on the first bottled water includes one or more of a pinching on a touch panel, a swiping on the touch panel, or a dragging with a mouse;
  replacing a first display of the first bottled water with a second display of second bottled water;
  wherein the second bottled water is of a second bottle capacity greater than the first bottle capacity if the input motion is in a first direction,
  wherein the second bottled water is of a second bottle capacity less than the first bottle capacity if the input motion is in a second direction and the second direction is approximately at right angles to the first direction,
  wherein the second number of bottles of the second bottle capacity corresponds to a second total volume of water, and
  wherein the first total volume of water matches the second total volume of water.

23. An image display system comprising:
  at least one memory configured to store computer program code; and at least one processor configured to access said at least one memory, read said computer program code, and operate as instructed by said computer program code, said computer program code including:

acquisition code configured to cause at least one of said at least one processor to acquire operation information containing a moving direction and a moving amount of an input position in an input operation on a first display object, the input operation being performed when the first display object is displayed on a display device, wherein the input operation on the first display object includes one or more of a pinching on a touch panel, a swiping on the touch panel, or a dragging with a mouse;

extraction code configured to cause at least one of said at least one processor to, when the moving amount of the input position in a predetermined first direction exceeds a predetermined threshold, acquire a first attribute parameter of the first display object which corresponds to the predetermined first direction, and extract a second display object associated with the first display object and having a first attribute parameter different from the first display object from a storage where a plurality of display objects are associated with attribute parameters; and display control code configured to cause at least one of said at least one processor to display the second display object extracted, instead of the first display object, on the display device, wherein the first attribute parameter relates to a first number of component objects of the first display object, wherein the first display object is a wrap-around sofa, wherein each component object of the first number of component objects is a sofa unit, and wherein the input operation is applied to a perspective drawing of the wrap-around sofa in a depth direction of the perspective drawing, and when the moving amount of the input position in the predetermined first direction contained in the operation information exceeds the predetermined threshold, the extraction code causes at least one of said at least one processor to extract, as the second display object, a second display object different in a second number of component objects from the first display object from the storage.

* * * * *